United States Patent [19]
Hayashi et al.

[11] Patent Number: 5,301,881
[45] Date of Patent: Apr. 12, 1994

[54] SYSTEM FOR DISPOSING WASTE

[75] Inventors: Masakatsu Hayashi, Ushiku; Yoshiyuki Takamura, Kudamatsu; Tsutomu Hasegawa, Niiza; Hideharu Mori; Tatsuji Katoh, both of Tokyo, Japan

[73] Assignee: Hitachi, Ltd., Tokyo, Japan

[21] Appl. No.: 56,937

[22] Filed: May 5, 1993

Related U.S. Application Data

[63] Continuation of Ser. No. 984,492, Dec. 2, 1992, abandoned.

[30] Foreign Application Priority Data

Dec. 2, 1991 [JP] Japan ................................. 3-317643

[51] Int. Cl.⁵ ............................................. B29C 29/00
[52] U.S. Cl. ........................................ 241/65; 241/23; 241/24; 241/DIG. 37; 241/DIG. 38
[58] Field of Search ................ 241/23, 24, , 65, 75, 241/DIG. 37, DIG. 38

[56] References Cited

U.S. PATENT DOCUMENTS 3,921,917 11/1975 Meinass .............................. 241/65
4,025,990 3/1977 Lovette .............................. 241/24
4,036,441 7/1977 Basten et al. .............. 241/DIG. 38

FOREIGN PATENT DOCUMENTS 50-81967 7/1975 Japan .
50-108765 8/1975 Japan .
50-156754 12/1975 Japan .
52-151371 12/1977 Japan .

Primary Examiner—Douglas D. Watts
Attorney, Agent, or Firm—Antonelli, Terry, Stout & Kraus

[57] ABSTRACT

A waste disposal system includes a stock yard for storing waste articles, a pre-treatment apparatus for separating a metal bulk from each waste article fed from the stock yard, a cryogenic crushing apparatus for crushing the separated metal bulk, and a crushing apparatus for crushing the portion of the waste article other than the metal bulk. The system further includes a light-weight article separating apparatus for separating the crushed waste from said crushing apparatus into foamed material and other wastes, and a foaming agent collecting apparatus which separates the foamed material into solid plastics and gaseous foaming agent and then cools and liquefies the gaseous foaming agent.

23 Claims, 18 Drawing Sheets

SYSTEM FOR DISPOSING WASTE

This application is a continuation application of application Ser. No. 984,492, filed Dec. 2, 1992, now abandoned.

BACKGROUND OF THE INVENTION

1. Field of the Invention

The present invention relates to a system for disposing waste articles and, more particularly, to a system capable of crushing wasted articles such as household electric machines and collecting valuable matters and harmful matters separately.

2. Description of the Related Art

Hitherto, large-size waste articles are used for reclaiming purpose as they are or after suitable treatment such as crushing or burning. Reclamation without any treatment is inconvenient from the viewpoint of efficient use of restricted land area, while burning of such waste articles poses a problem of "warming" of the earth due to generation of carbon dioxide. Furthermore, waste articles are generally rich in vinyl chloride type plastics which, when burnt, generate noxious gases such as chlorine gas and chloride gases. Such gases undesirably damage the furnace in which the waste articles are burnt, resulting in shortened life of the furnace. Furthermore, such gases seriously impair environmental conditions when relieved to the atmospheric air. It is therefore necessary to employ a suitable means which would prevent such gases from being relieved into the air.

Recovery or collection of metals from waste articles rich in metal is broadly conducted as disclosed in Japanese Unexamined Patent Publication No. 50-156754, but no proposal has been made as to collection of the residue, i.e., the matters left after the removal of the metals. Such residue is usually used for reclaiming purpose with or without treatment such as burning, thus posing the aforesaid problems. Methods have been proposed in Japanese Unexamined Patent Publication Nos. 50-108765 and 50-81967 for sorting waste articles, but these proposed methods are directed mainly to sorting metals out of other components. Thus, plastics are handled together with paper and other matters, without being sorted out of other matters.

A simple method for sorting plastics makes use of difference in specific gravity, as disclosed in Japanese Unexamined Patent Publication Nos. 52-151371 and 58-205552. The methods disclosed in these publications are effective when different components of the waste have different values of specific gravity but are ineffective when different components have similar values of specific gravity as are the cases of different types of plastics having similar specific gravity values.

Another sorting method relies upon the difference in melting points. This type of method is considered to be effective in disposing foamed articles made of thermoplastic materials. However, noxious gases are generated during melting when the plastics include vinyl chloride type plastics, resulting in the problems such as damaging of the apparatus and destruction of environmental conditions.

Thus, the known disposing method in which large-size waste articles are used for reclaiming purpose after a volume reduction through crushing and burning poses problems such as warming of the earth due to generation of carbon dioxide and serious damaging of burning furnaces particularly when vinyl chloride type plastics are included.

The method of the type disclosed in Japanese Unexamined Patent Publication No. 50-156754, in which metals are collected and the residues are used for reclamation, cannot satisfactorily meet the demand for efficient use of restricted land area because this method cannot provide sufficient volume reducing effect.

The methods disclosed in Japanese Unexamined Patent Publication Nos. 52-151371 and 58-205552 cannot provide satisfactory sorting effect when the waste contain different components of similar specific gravity values. Sorting according to the specific gravity is not suitable when the waste includes any component which varies specific gravity according to the state, e.g., foamed articles.

Sorting according to difference in melting temperature is rather unsuitable for use in disposal of general waste articles which often contain vinyl chloride type plastics, since such plastics generate noxious gases during melting, resulting in problems such as damaging of the disposal apparatus and destruction of environmental conditions. Furthermore, this method cannot be used in disposing articles formed from thermosetting plastics because such plastics are never decomposed by heating.

Flons (freons) have been broadly used as a foaming agent for forming foamed articles. The use of flon is quite a common practice in the production of foamed thermal insulators because this foaming agent provides high thermal insulation effect. Nowadays, however, the use of flon type foaming agents is strictly limited by regulations in order to preserve ozone layer around the earth. Preservation of ozone layer requires not only limitation in the use of flon type foaming agents but also collection and disposal of flon type foaming agent which have already been confined in foamed articles to be wasted. Known disposal method poses a problem that the flon trapped in foamed articles as the foaming agent is undesirably relieved to the atmospheric air.

SUMMARY OF THE INVENTION

Accordingly, an object of the present invention is to provide a waste disposal apparatus which can collect and recover almost the whole parts of waste for the purposes of further use and preservation of natural resources available on the earth.

Another object of the present invention is to provide a waste disposal apparatus which can effectively collect flon to prevent scattering of flon, thereby preventing breakage of ozone layer which may otherwise be caused by relief of flon into the atmospheric air.

To these ends, according to one aspect of the present invention, there is provided a waste disposal system, comprising: a stock yard for storing waste articles; pretreatment apparatus including metal bulk separating means for separating a metal bulk from each waste article; a cryogenic crushing apparatus for crushing the metal bulk separated by the metal bulk separating means a crushing apparatus for crushing the waste article into fragments after separation of the metal bulks therefrom; a light-weight article separating apparatus for separating the fragments of the waste articles obtained through the crushing performed by the crushing apparatus into fragments of foamed material and other waste; and a foaming agent collecting apparatus including a crusher for crushing the fragments of the foamed material separated by the light-weight article separating apparatus, a separator for separating the crushed fragments of the foamed material into plastics and a gaseous foaming agent, and a foaming agent cooling device for liquefying the gaseous foaming agent by cooling.

According to the present invention, almost whole parts of waste can be collected for further use, greatly reducing the demand for treatment such as burning of the waste. Thus, the present invention makes a great contribution to prevention of "warming" of the earth which is attributable to carbon dioxide generated as a result of the burning. Furthermore, the present invention is effective in collecting flon from foamed material in waste articles, thus contributing also remarkably to preservation of ozone layer.

The above and other objects, features and advantages of the present invention will become clear from the following description of the preferred embodiments taken in conjunction with the accompanying drawings.

BRIEF DESCRIPTION OF THE DRAWINGS

FIGS. 9 to 14 are illustrations of still another embodiment, wherein:

FIG. 9 is a schematic illustration showing an arrangement of a stock yard, a feeding apparatus, pre-treatment apparatus and a metal bulk crushing apparatus;

FIG. 10 is a schematic illustration of the construction of a refrigerant collecting means;

FIG. 11 is a schematic illustration of the construction of a crushing apparatus and a light-weight waste separating apparatus;

FIG. 12 is a schematic illustration of the construction of a plastics sorting apparatus;

FIG. 13 is a schematic illustration of the construction of a plastics sorting apparatus; and FIG. 14 is a schematic illustration of the construction of a foaming agent collecting apparatus;

FIGS. 15 to 20 are illustrations of a further embodiment of the present invention, wherein:

FIG. 15 is a schematic illustration showing an arrangement of a stock yard and a feeding apparatus;

FIG. 16 is a schematic illustration of the construction of a crushing apparatus;

FIG. 17 is a schematic illustration of the construction of a metal bulk crushing apparatus;

FIG. 18 is a schematic illustration of the construction of a metal separating apparatus;

FIG. 19 is a schematic illustration of the construction of a plastics sorting apparatus; and FIG. 20 is a schematic illustration of the construction of a foaming agent collecting apparatus.

DESCRIPTION OF THE PREFERRED EMBODIMENTS

Figure 1:
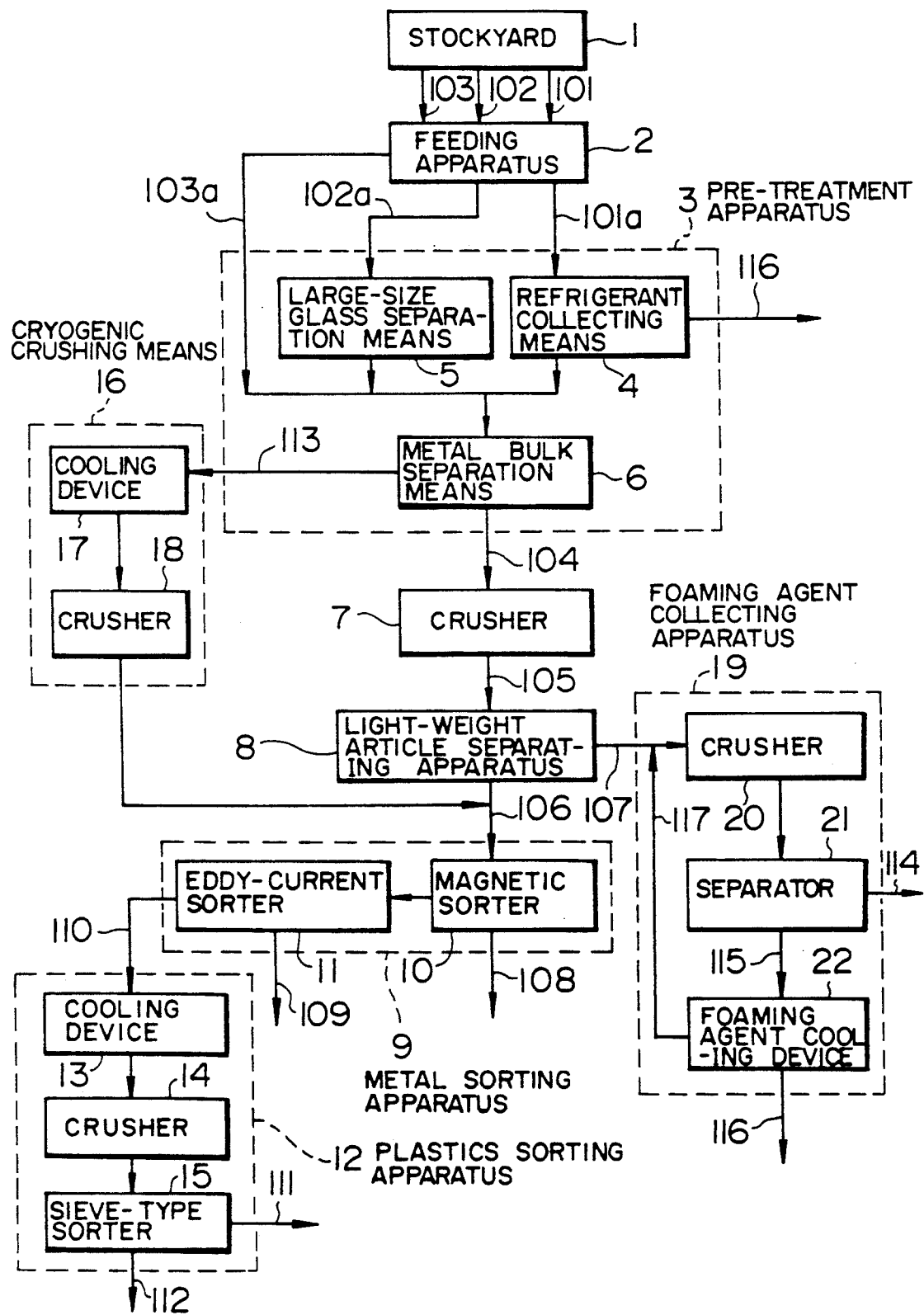
FIG. 1 is a block diagram showing the construction of the whole of an embodiment of the waste disposal system in accordance with the present invention.

An embodiment of the waste disposal system of the present invention will be described with reference to FIG. 1 which is an illustration of the whole part of the embodiment. Referring to this Figure, the waste disposal system includes a stock yard 1 in which waste articles roughly sorted according to types are stored, a feeding apparatus 2 and a pre-treatment apparatus 3 to which the waste articles are fed by the feeding apparatus 2. The pre-treatment apparatus includes a refrigerant collecting means 4, a large-size glass separating means 5 and a metal bulk separating means 6. The disposal system further has a crushing apparatus 7 which has one or two crushing stages, a light-weight waste separating apparatus 8, and a metal sorting apparatus 9. The metal sorting apparatus 9 includes a magnetic sorter 10 and an eddy-current sorter 11. The system further has a plastics sorting apparatus 12 which includes a cooling device 13, a crusher 14 and a sieve type sorter 15. The system further has a cryogenic crushing apparatus 16 for crushing metal bulks. This apparatus 16 includes a refrigerator 17 and a crusher 18. The system further has a foaming agent collecting apparatus 19 which includes a crusher 20 for crushing foamed articles, a separator 21 for separating foaming agent and resin components from each other and a foaming agent cooling device 22.

Wasted household electric machines collected by a collecting truck are roughly sorted into four types: namely, refrigerators, air conditioners, televisions and laundry machines and are stored in the stock yard 1. The wasted household electric machines of each type are then fed by the feeding apparatus 2 into the pre-treatment apparatus. In the pre-treatment apparatus 3, refrigerants in the refrigerators and air conditioners are extracted as indicated by arrows 101 and 101a by the refrigerant collecting means 4 which will be detailed later and which is incorporated in the pre-treatment apparatus 3, and the extracted refrigerant is collected as indicated by the arrow 116. Subsequently, the compressor is detached from each refrigerator by the metal bulk separating means 6. When the waste articles are televisions, large-size glass separating means 5 in the pre-treatment apparatus 3 detaches cathode ray tubes from the television units, as indicated by arrows 102, 102a. In the case where the waste is a machine other that refrigerator, air conditioner and television, e.g., a laundry machine, metal bulks such as motor are detached from the waste by the metal bulk separating means 6, as indicated by arrows 103, 103a. The metal bulk separating means 6 may include a guillotine-type machine which is a kind of shearing machines. The large-size glass separating means 5 may be of an impact type which crushes glasses by striking them several times by a hammer or of compression type which crushes glasses by compression.

As a result of the pre-treatment, metal bulks are removed from the wasted household electric machines, and the residue components are sent as indicated by arrow 104 to the crushing apparatus 7 which crushes the residue components into fragments of 50 to 100 mm by a single or dual stage crushing mechanism. The fragments are then sorted according to the kind of material. The use of dual- or multi-stage crushing mechanism is preferred for handling refrigerators because such waste requires separation of foamed urethane from a thin iron sheets.

The waste fragments generated by the crushing apparatus 7 and then sorted according to the type of material are then forwarded to the light-weight article separating apparatus 8 which separate light-weight fragments such as pieces of foamed urethane, as indicated by an arrow 105. The light-weight fragments thus separated is delivered to the foaming agent collecting apparatus 19 as indicated by an arrow 107, whereas heavy fragments separated from the foamed fragments are sent to the metal sorting apparatus 9, as indicated by an arrow 106. The light-weight article separating apparatus 8 may be of the type which blows air to the waste fragments discharged from the crushing apparatus 7 s as to sort foamed fragments out of other fragments, by making use of the fact that the specific gravities of such fragments are much smaller than those of other fragments. Alternatively, an inclined vibration conveyor is used as the light-weight article separating apparatus, such that light-weight foamed fragments are taken out from an upper part of the conveyor while heavier fragments are collected from a lower portion of the conveyor.

Metal bulks such as compressors or motors separated by the metal bulk separating apparatus 6 of the pre-treatment apparatus 3 are sent as indicated by an arrow 113 to the refrigerating crushing apparatus 16. In this apparatus 16, the metal bulks are cooled to a very low temperature of $-100°$ C. or lower by the cooling device 17 and are crushed into fragments by the crusher 18. The crushing is performed with comparatively small impact force, by virtue of cold embrittlement generally exhibited by metals. The metal fragments thus obtained are delivered to the metal sorting apparatus 9 as indicated by the arrow 106, together with the heavy components from the light-weight article separation apparatus 8.

Ferrous metal fragments are first sorted out of the metal fragments by means of the magnetic sorter 10 in the metal sorting apparatus, and are collected as indicated by an arrow 108. Subsequently, non-ferrous metal fragments are separated by the eddy-current sorter 11 and are collected as indicated by an arrow 109. Thus, the residue consists mainly of plastics. The plastics fragments are then sent to the plastics sorting apparatus 12 as indicated by an arrow 110. As described before, the plastics sorting apparatus 12 includes a cooling device 13, a crusher 14 and a sieve type sorter 15. The plastics fragments supplied to the plastics sorting apparatus 12 are first cooled by the cooling device 13 to a temperature between $0°$ C. and $-60°$ C. and are crushed by the crusher 14 which is typically an impact type crusher. The plastics sorting apparatus 12 sorts plastics fragments according to the difference in embrittlement temperature between different types of plastics. Vinyl chloride type plastics generally exhibit higher embrittlement temperatures than other plastics and, therefore, are crushed into fragments finer than those of other plastics. The fragments crushed by the crusher 14 are sent to the sieve type sorter which sorts the plastics fragments into finer ones which are mainly composed of vinyl chloride type plastics and comparatively large plastics fragments which contain only a small amount of vinyl chloride type plastics. Thus, the plastics of vinyl chloride type are sorted as indicated by an arrow 111, while the remainder plastics are collected as indicated by an arrow 112 as plastics which are easy to reuse.

Meanwhile, the foamed articles separated by the light-weight article separating apparatus 8 are delivered as at arrow 107 to the foaming agent collecting apparatus 19 in which the foamed articles are crushed by the crusher 20 and then sorted into solid plastics and gaseous foaming agent by the separator 21. The solid plastics are collected as indicated by an arrow 114, while the gaseous foaming agent is mixed with the ambient air and the mixture is sent to the cooling device 22 as indicated by an arrow 115. The gaseous mixture is cooled by the cooling device 22 so that the foaming agent is liquefied and collected as indicated by an arrow 116, whereas the air is returned to the crusher 20 as indicated by an arrow 117. Consequently, flon gas used as the foaming agent and the plastics are separated from each other and are collected independently.

It is thus possible to sort and collect flon-type refrigerant or foaming gases which hitherto could not be collected. In addition to recovery of metal components, plastics also are sorted and plastic components which are suitable for reuse are collected for further use, so that the amount of waste to be sent for reclamation is greatly reduced.

In the described embodiment, detaching of the metal bulks such as compressors and motors performed by the pre-treatment apparatus 3 is intended for ensuring safe functioning, as well as long life, of the crushing apparatus 7. In the embodiment as described, the crushing apparatus 7 plays a double role of shearing thin metals and separation of metals from plastics. Thus, the crushing apparatus 7 is designed so as to be able to shear metal sheets of thicknesses around 0.1 mm. Therefore, if the metal bulks such as motors are introduced into the crushing apparatus 7, shearing blades are seriously damaged to disable the crushing apparatus 7 to perform the above-mentioned double role. The crushing apparatus 7 is the apparatus which initially crush large-size articles and, hence, may be heavily burdened. Crushing of metal bulks with this apparatus 7 therefore would surely cause locking of the apparatus.

Figure 2:
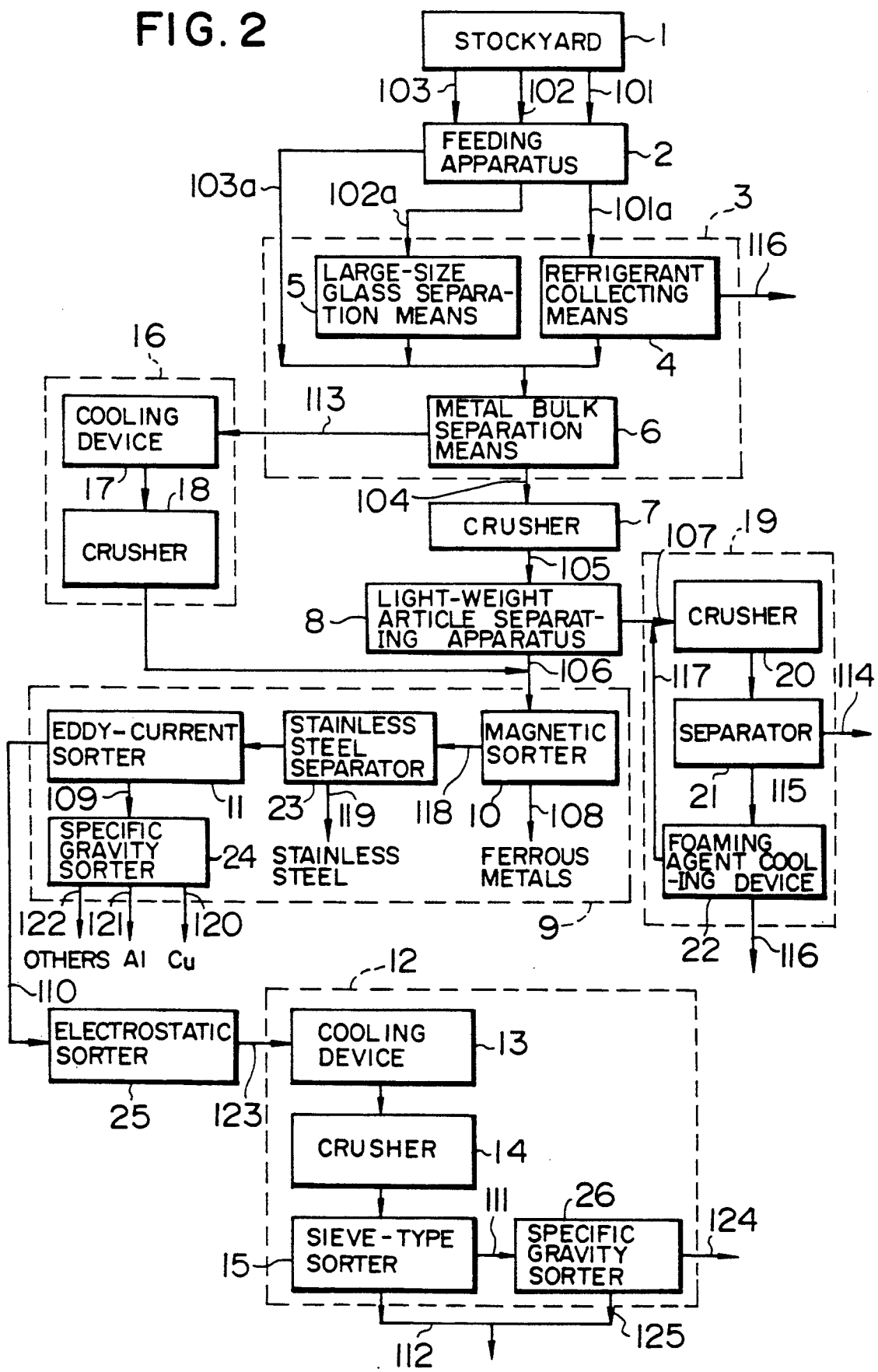
FIG. 2 is a block diagram similar to FIG. 1 but showing another embodiment of the present invention.

Another embodiment of the present invention will be described with reference to FIG. 2. Referring to FIG. 2, the waste disposal system as another embodiment has a metal sorting apparatus 9 which is similar to that used in the first embodiment except that it additionally includes a stainless steel separator 23 and a specific gravity sorter 24. The system also has a plastic sorting apparatus 12 which is basically the same as that in the first embodiment except that it additionally has a specific gravity sorter 26. The system further has an electrostatic separator 25 provided between the metal sorting apparatus 9 and the plastics sorting apparatus 12. In some cases, the metal fragments after separation of ferrous metal fragments performed by the magnetic sorter 10 include fragments of stainless steel which is generally considered as being non-magnetic. Furthermore, the fragments also may contain wood pieces which are generated when wooden television casing have been crushed. The embodiment shown in FIG. 2 is intended to cope with demands for separation and collection of stainless steel and wood. Although stainless steel is generally considered as being non-magnetic, stainless steel, when subjected to cutting, bending or other machining, exhibits local changes in the metallurgical structure, which allows magnetization although the extent of the magnetization is very slight. The stainless steel separator 23 used in this embodiment is capable of generating much stronger magnetism than that generated by ordinary magnetic sorter used for separation of ferrous metals, and is capable of separating stainless steel fragments which have been magnetized slightly.

The non-ferrous metal fragments separated by the eddy-current sorter 1 and collected as indicated by the arrow 109 are delivered to the specific gravity sorter 24 which sorts such non-ferrous metal fragments according to the kind of material so as to facilitate reuse of the materials. In this embodiment, the non-ferrous ferrous metal fragments are sorted into three types: copper fragments collected as indicated by an arrow 120, aluminum fragments collected as indicated by an arrow 121 and other non-ferrous metal fragments collected as denoted by an arrow 122. The reference specific gravity liquid to be used in the specific gravity sorter 24 should have a specific gravity not smaller than 2.0, considering that the liquid is used for sorting metals. Such requirement is met by only few metals. Therefore, this embodiment employs, as the reference specific gravity liquid, a magnetic fluid which seemingly exhibit different values of specific gravity according to the intensity of magnetic field applied thereto. By employing two different magnetic intensity levels, it is possible to sort three kinds of non-ferrous metals. Another specific gravity liquid may be water or oil with metal powder suspended therein to control the specific gravity of the liquid.

Consequently, the waste fragments discharged from the metal sorting apparatus 9 as indicted by arrow 110 are mainly plastics fragments. It is, however, conceivable that wood fragments generated from, for example, television case are also included. In order to facilitate reuse of the finally sorted plastics, it is desirable that such wood fragments are separated from the plastics. To enable such separation, the embodiment shown in FIG. 2 employs the aforementioned electrostatic separator 25 connected to the outlet end of the metal sorting apparatus 9. The electrostatic separator 25 is composed of a separator alone or a drier and a separator. The electrostatic separator 25 is capable of separating different materials from one another by making use of electrostatic chargeability of the materials. Wood fragments can easily be separated because wood generally exhibits much smaller chargeability than plastics.

The waste fragments discharged from the electrostatic separator 25, mainly composed of plastic fragments, are sent to the plastics sorting apparatus 12 as indicated by an arrow. The plastics fragments are then sorted into two groups: a first group rich in vinyl chloride type plastics fragments collected as indicated by an arrow 111 and a second group which contain only a small amount of vinyl chloride type plastics and which are collected as denoted by 112. The waste fragments indicated by the arrow 111, however, still contain plastics which are other than vinyl chloride type plastics and which are reusable. It is therefore desirable that such reusable plastics are separated and collected from the waste fragments indicated by the arrow 111. To meet such a demand, the embodiment shown in FIG. 2 employs the specific gravity sorter 26. Plastics of vinyl chloride type generally exhibit comparatively large specific gravity values, e.g., 1.2 to 1.6. Fragments of vinyl chloride type plastics, therefore, are precipitated in the specific gravity sorter 26 and are collected as indicated by an arrow 124, whereas reusable plastic fragments are separated by flotation and collected as indicated by an arrow 125. The embodiment shown in FIG. 2 provides additional advantages over the embodiment shown in FIG. 1 in that the metal fragments are further sorted and the rate of recovery of reusable plastics is enhanced. In the embodiments shown in FIGS. 1 and 2, each of the magnetic sorter 10, the eddy-current sorter 11 and the stainless steel sorter 23 in the metal sorting apparatus 9 has a single staged structure. Each of such sorters, however, may have plural stages according to the sorting demand. A further improvement in the sorting efficiency can be attained by using such multi-stage sorters. The specific gravity sorters 24 and 26 may also be of multi-staged structures to increase the number of sorting and improve the sorting efficiency.

Figure 3:
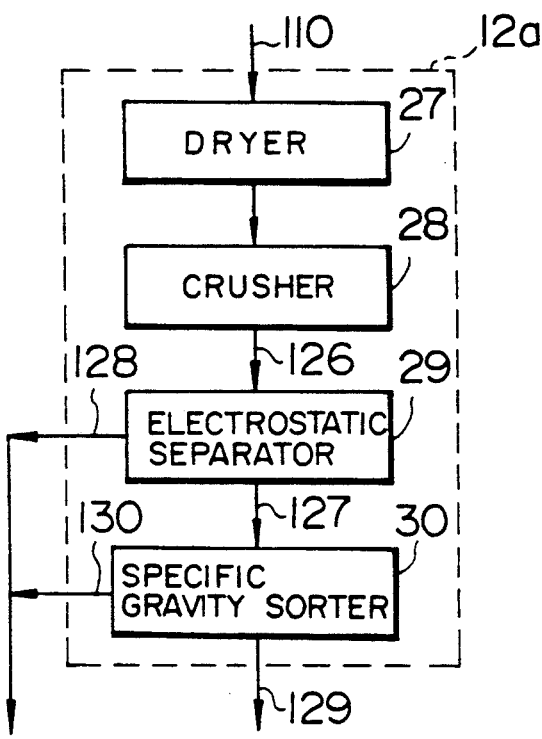
FIG. 3 is a block diagram showing the construction of a modification to a plastics sorting apparatus used in the system shown in FIGS. 1 and 2.

FIG. 3 shows a modification which employs a plastics sorting apparatus 12a which is different from the plastics sorting apparatus 12 used in the preceding embodiment. The plastic sorting apparatus 12a includes a dryer 27, a crusher 28, an electrostatic separator 29 and a specific gravity sorter 30. Waste articles, separated from the metals by a metal sorting apparatus 9 which may be of the same type as that in FIGS. 1 or 2, are dried by the drier 27 and crushed by the crusher 28 into grains of a regulated size. The plastics waste granules of the regulated size are sent to the electrostatic separator 29 which separates the plastic grains int two groups: a first group mainly consisting of plastics having high electrostatic chargeability, e.g., polyethylene resin and vinyl chloride resin, sorted as indicated by an arrow 127, and a second group consisting mainly of other plastics having small levels of electrostatic chargeability and denoted by 128. The first group of plastics having high electrostatic chargeability contains plastics fragments of vinyl chloride type, so that this group is sent to the specific gravity sorter 30 in which the plastic granules of vinyl chloride type are separated and removed as indicated by an arrow 129, while plastics suitable for reuse are collected as indicated by an arrow 130.

The use of the dryer 27 is not essential. Namely, it is possible to omit the dryer 27 provided that the waste introduced into the plastic sorting apparatus 12a is dry. Thus, the plastic sorting apparatus 12a, with the dryer omitted, may be used in the embodiment shown in FIG. 2.

Figure 4:
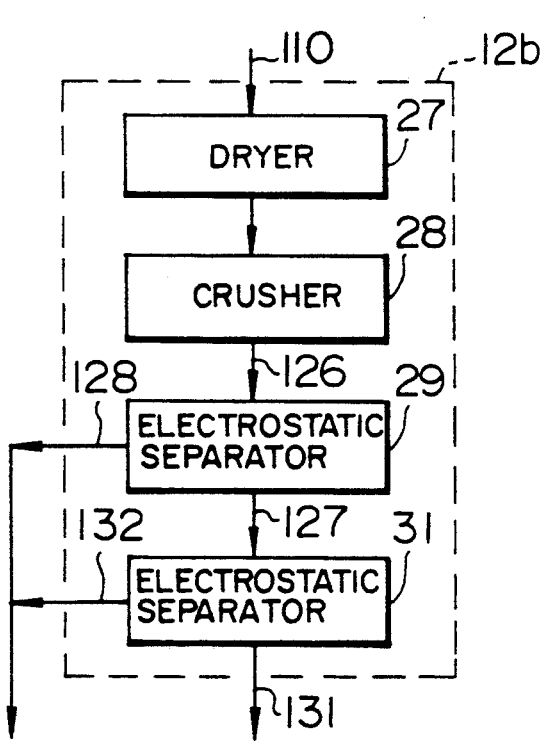
FIG. 4 is a block diagram similar to FIG. 3 but showing another modification.

Another modification having a still different type of the plastic sorting apparatus is shown in FIG. 4. The plastic sorting apparatus 12b used in this modification employs a multi-stage electrostatic sorter for separating plastics. More specifically, this plastics sorting apparatus 12b employs a drier 27, a crusher 28 through which waste granules of a regular size are obtained, a first stage electrostatic separator 29 which separates, as indicate by an arrow 127, plastics of polystyrene type and vinyl chloride type having high electrostatic chargeability, and a second-stage electrostatic separator 31 which separates polystyrene type plastics 132 and vinyl chloride type plastics 131 from each other.

Figure 5:
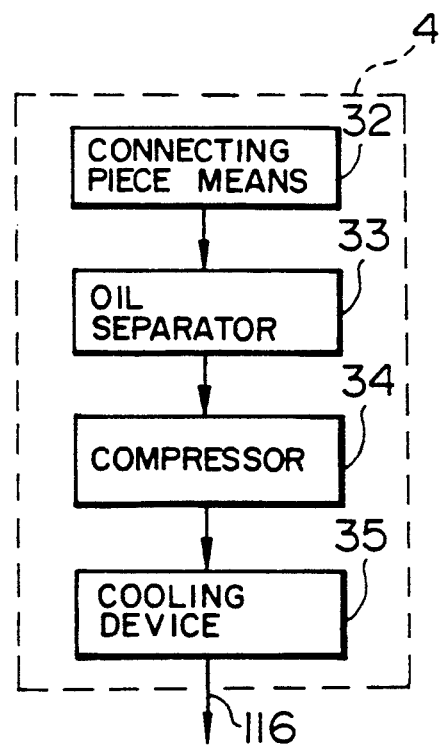
FIG. 5 is a block diagram showing practical construction of a refrigerant collecting means used in the apparatuses shown in FIGS. 1 and 2.

FIG. 5 shows an example of the refrigerant collecting means or apparatus 4. The refrigerant collecting apparatus 4 has a connecting piece means 32 for extracting refrigerant from a refrigerator, an oil separator 33 for separating lubricating oil from the refrigerant-oil mixture, a compressor 34 for generating refrigerant collecting power, a cooling device 35 for cooling and liquefying the refrigerant, and a piping which interconnects these components to form a system isolated from the ambient air. In operation of the refrigerant collecting apparatus 4, the compressor 34 is activated to lower the internal pressure of a section of the above-mentioned closed system between the connecting piece means 32 upstream of the compressor 34 and the oil separator 33, so as to suck refrigerant from the refrigerator. Then, oil is separated in the oil separator, while the refrigerant is compressed by the compressor 34 to high pressure and temperature. The compressed refrigerant is then cooled by the cooling device 35 so as to be condensed into liquid phase. The refrigerant thus liquefied is collected in a refrigerant cylinder or the like (not shown), as indicated by an arrow 116. The connector piece means 32 may be of a type which has a keen stubbing projection capable of piercing the refrigerant piping to enable extraction of the refrigerant from the refrigerator.

Figure 6:
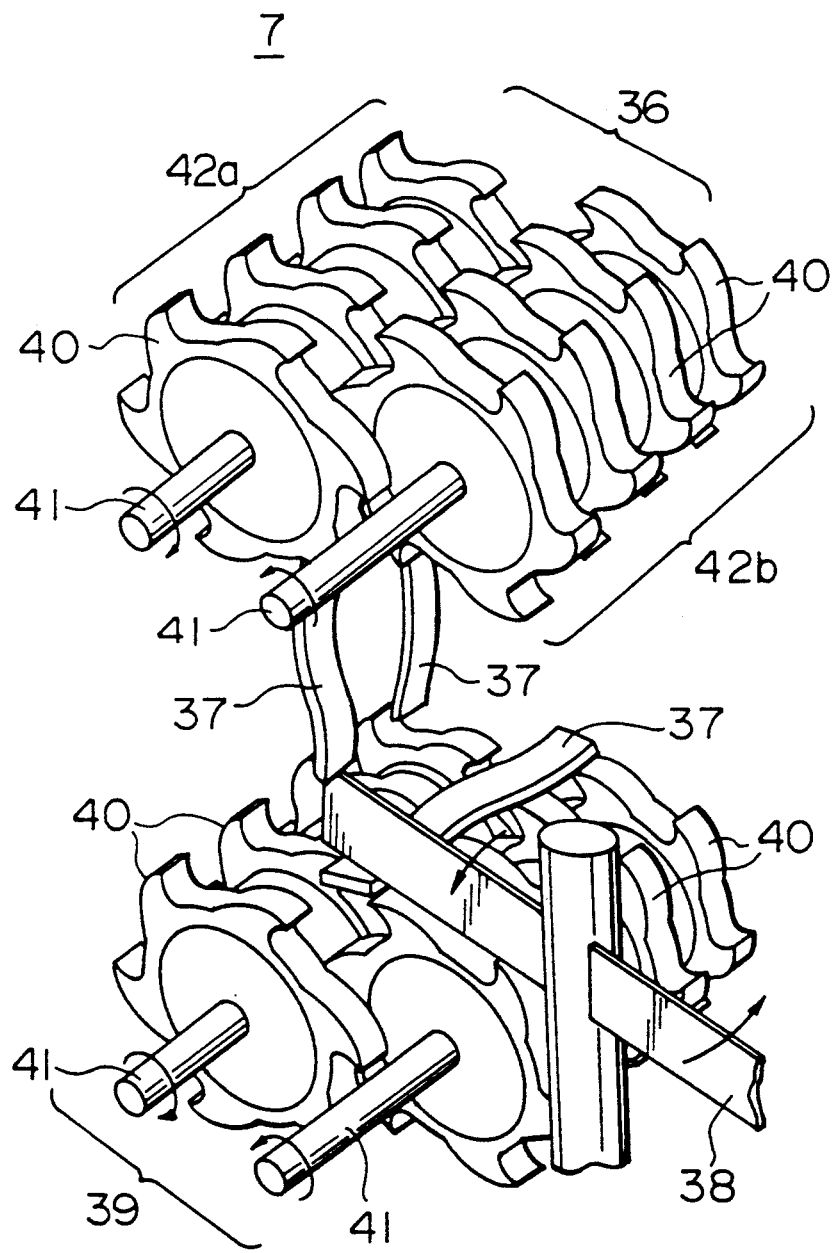
FIG. 6 is a perspective view of a crusher used in a crushing apparatus incorporated in the system shown in FIG. 1.

FIG. 6 illustrates an example of the crushing apparatus 7. As described before, the crushing apparatus has a function to coarsely crush waste articles and to sort the fragments according to the kind of the material, as well as a function to separate from panels of metals and plastics foamed urethane layers used as a thermal insulator in a refrigerator. The crushing apparatus 7 shown in FIG. 6 has a first-stage crusher 36 which crushes the waste into web-like pieces 37, rotary blades 38 for changing orientation of the web-like pieces 37 and a second-stage crusher 39 which crushes the web-like pieces 37 in directions different from those of crushing performed in the first stage. Each of the crushers 36 and 39 has a rotary cutter 42a, 42b having a pair of shafts 41 carrying a multiplicity of crusher blades 40 and arranged such that these blades are interdigitated.

Figure 7:
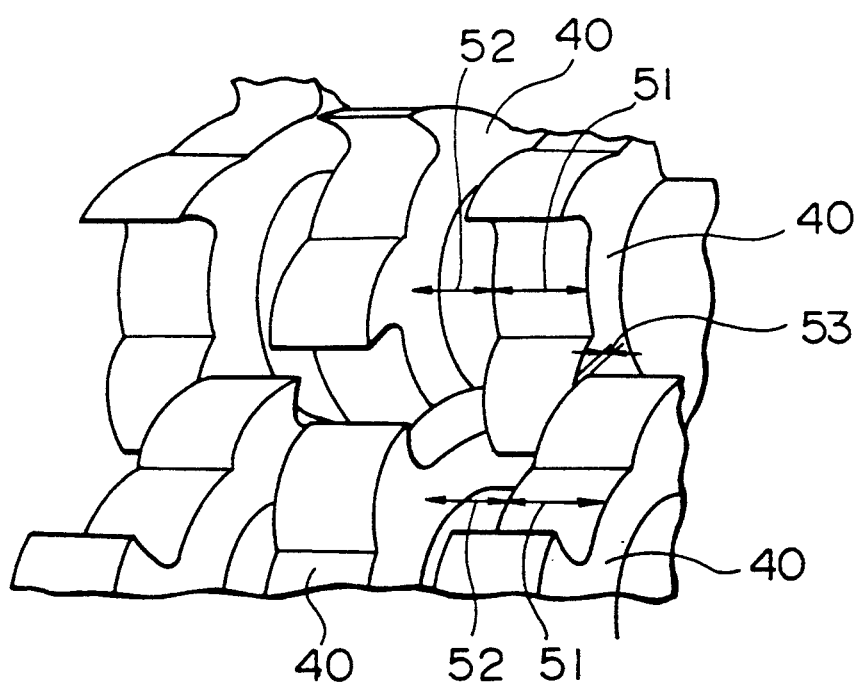
FIG. 7 is a fragmentary enlarged perspective view of a rotary blade of the crusher.

As will be seen from FIG. 7, the thickness 51 of the crusher blades 40 an the spacing 52 of the same are determined to be 50 to 100 mm, such that interdigitated crusher blades face each other at a distance 53 of 1 to 10 mm. With tis arrangement, it is possible to shear the waste into fragments of 50 to 100 mm long. The clearance 53 between the crusher blades 42a and 42b of both rotary shafts slightly reduces the shearing effect but provides an appreciable effect to enable the crushers 36, 39 to apply to the waste fragments forces which act in such a direction as to exfoliate the material from metals. It is thus possible to separate thin layer of foamed material such as a heat insulator from metals on which such layer has been adhered.

Figure 8:
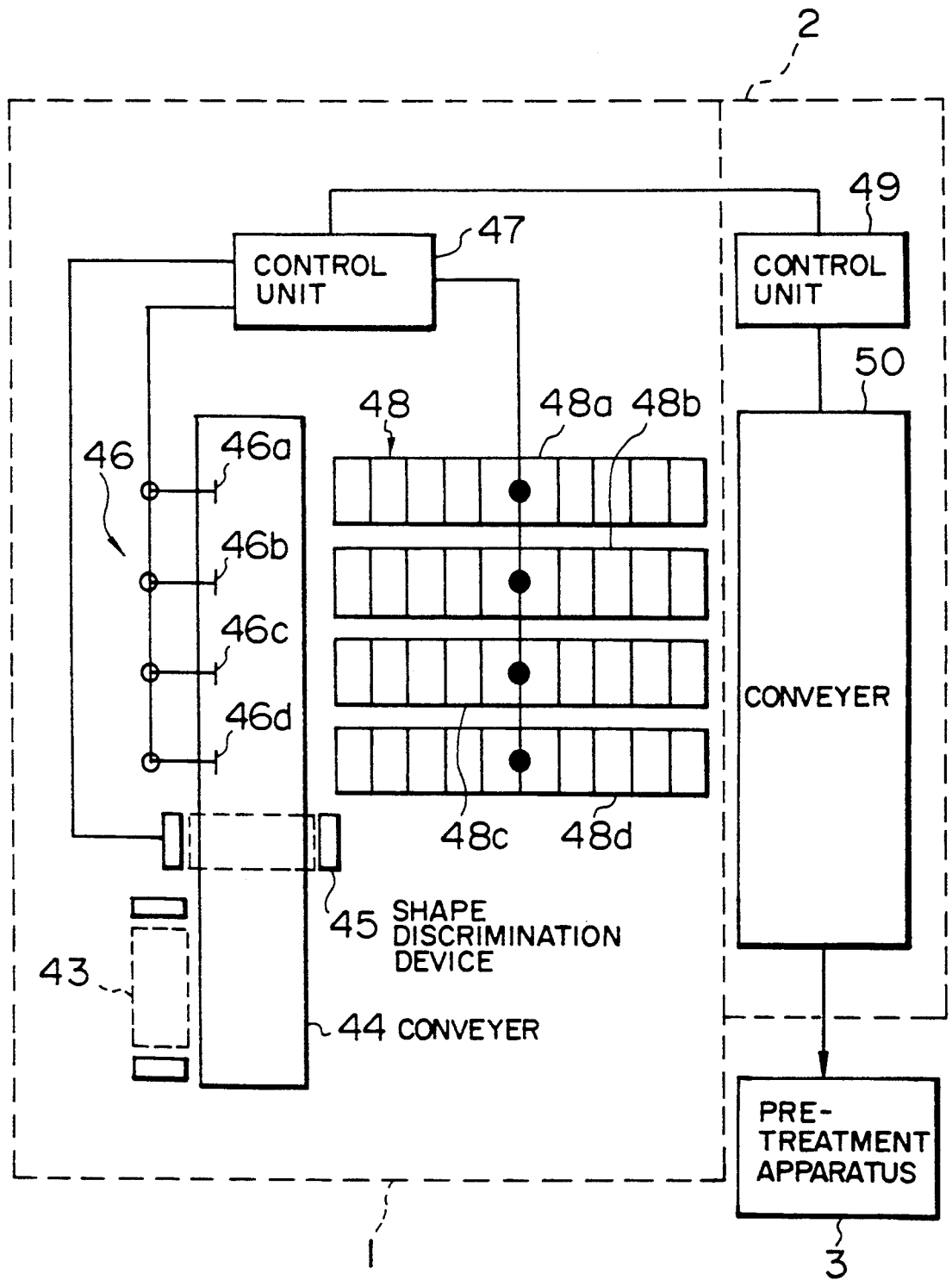
FIG. 8 is a schematic illustration showing an arrangement of a stock yard and a feeding apparatus in the systems shown in FIGS. 1 and 2.
Figure 9:
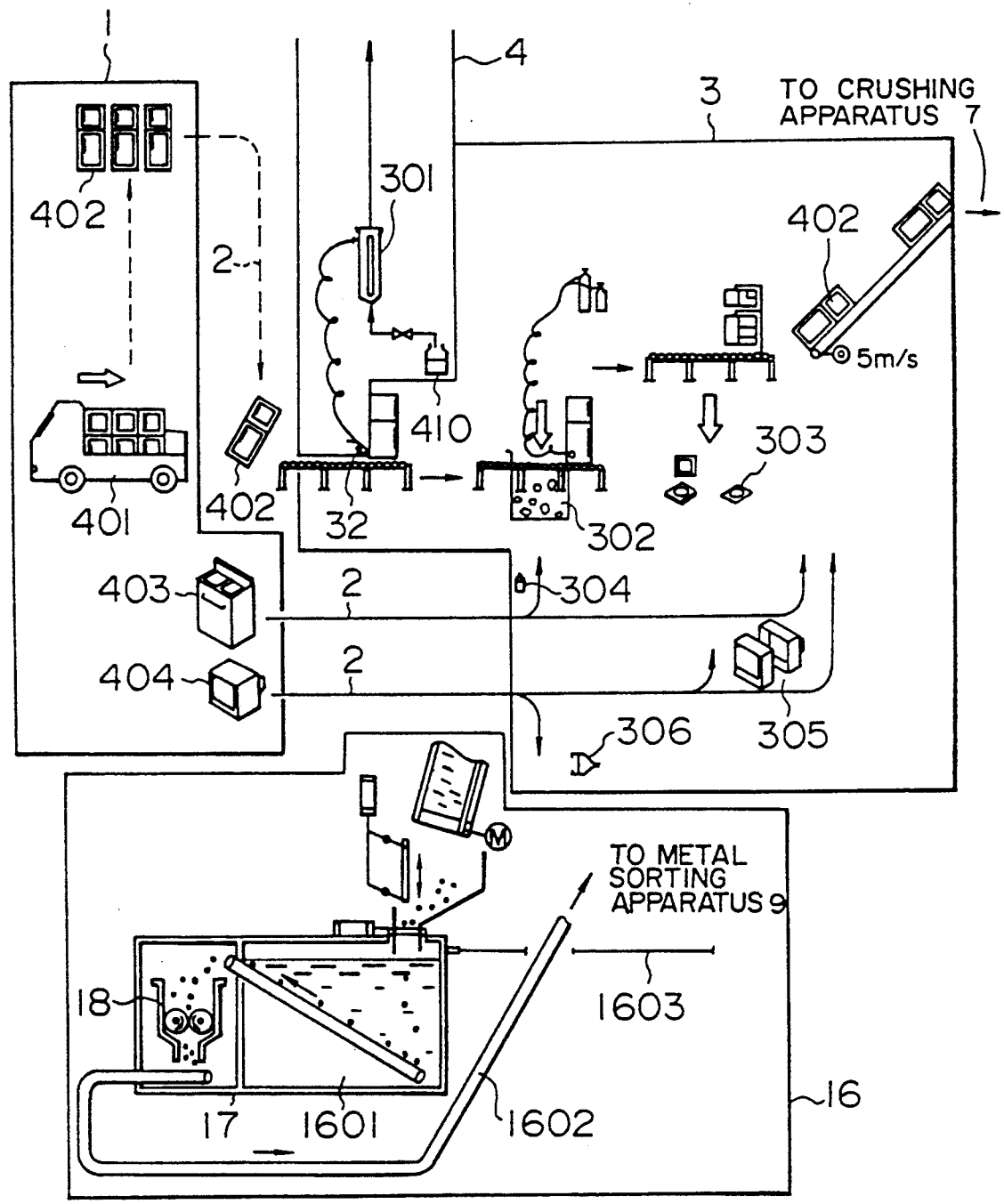
Figure 10:
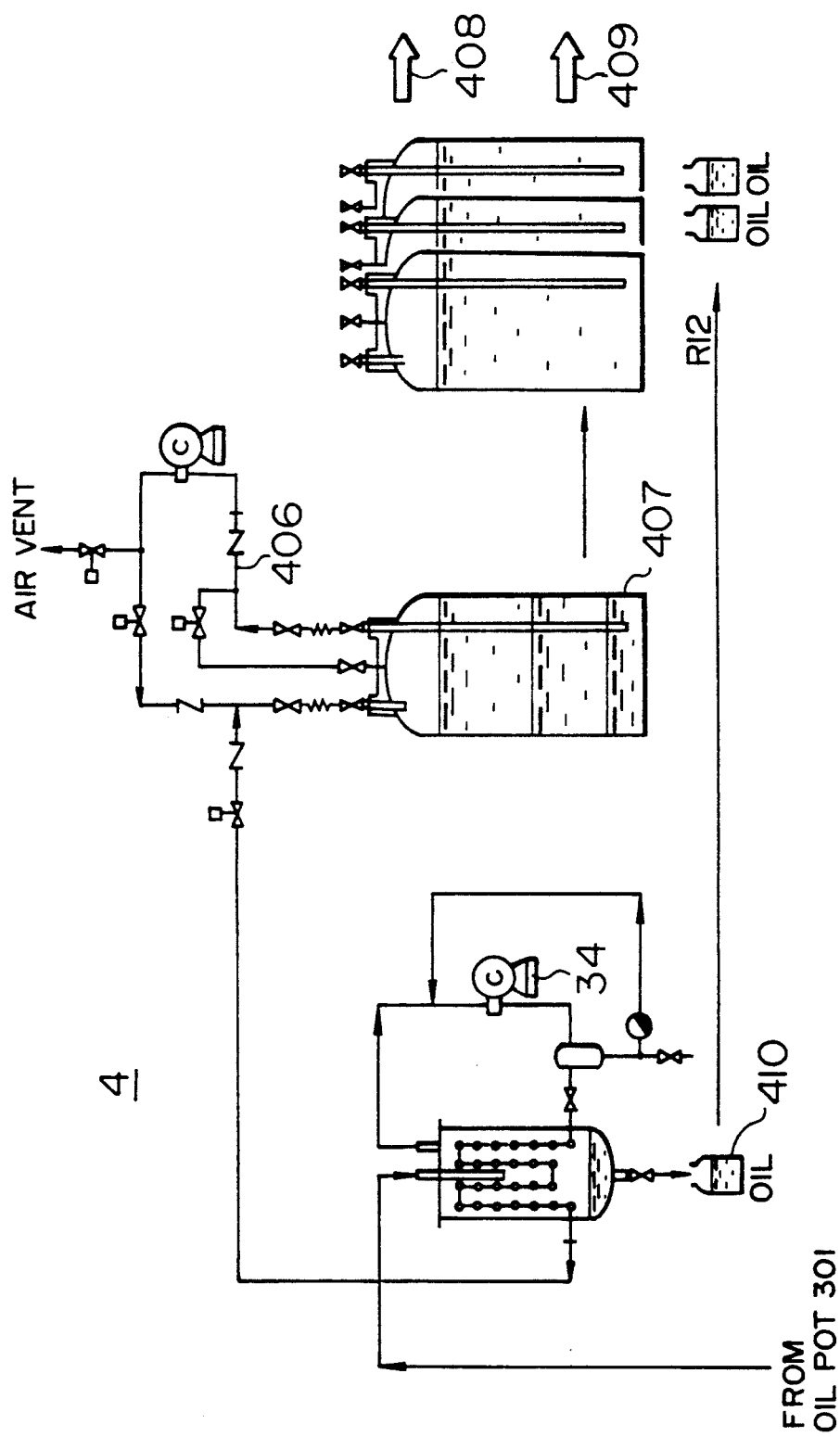

FIG. 8 illustrates an embodiment having a specific arrangement of the stock yard 1 and the feeding apparatus 2 designed to facilitate automatic operation of the whole system. The stock yard 1 has an entrance 43, a conveyor 44, a shape discriminating device 45, an exchanger 46, a control device 47 and storage conveyors 48a to 48d. In the illustrated arrangement, waste articles delivered by a collecting truck are moved onto the conveyor 44 through the entrance 43. During conveying by the conveyor 44, the waste articles are subjected to shape discrimination performed by the shape discrimination device 45 which is provided at an intermediate portion of the conveyor 44 so that the waste articles are discriminated according to their shapes into a plurality of types. The articles are further conveyed to the exchanger 46. Meanwhile, the control device 47 operates to select one of storage conveyors 48a to 48d on the basis of the discrimination data derived from the shape discrimination device 45, and activates the exchanging device 46 to direct each waste article to a corresponding storage conveyor, e.g., 48a, whereby the article is stored. Among the waste articles stored on the storage conveyors, the articles of the type designated by instructions from the control device 49 are then shifted onto the conveyor 50 and are sent to the pre-treatment apparatus 3 by means of this conveyor. The stockyard having the described arrangement can sort a number of waste articles according to the type of the articles and can store them for pre-treatment. The shape discrimination device 45 may be of the type which automatically discriminates configurations by using X-ray. Shape discrimination, however, may be conducted by naked eyes of an operator.

The waste disposal system of the invention having the described embodiment enables most part of waste articles to be collected and recovered for reuse. Thus, the present invention effectively reduces reclamation land area and enables efficient use of resources. Furthermore, the invention contributes to preservation of ozone layer around the earth, through collection of flon-type gases.

FIGS. 9 to 14 are illustrations of still another embodiment of the waste disposal system of the present invention. The system has a stock yard 1, a feeding apparatus 2, a pre-treatment apparatus 3 and a metal bulk crushing apparatus 16. Waste articles such as refrigerators 402, laundry machines 403, television 404 and the like, delivered by a collecting vehicle, are sent to the pre-treatment apparatus 3 by the feeding apparatus 2 which may be a conveyor. When the waste article to be pre-treated is a refrigerator, the pre-treatment apparatus 3 operates to extract refrigerant from the refrigerator, by the operation of a refrigerant refrigerant collection means 4. As will be seen from FIGS. 9 and 10, the refrigerant recovery means 4 includes a connecting piece means 32, an oil pot 301, a compressor 34 and a liquid circulating pump 406. The refrigerant and oil collected by the refrigerant collecting means 4 are respectively received in a refrigerant pot 407 and the oil collecting pot 410, and are forwarded to regenerating treatment factories as indicated by arrows 408 and 409.

Subsequently, metallic or metal-containing parts such as compressor 302 and magnet-containing packing rubber 303 are detached from the frame of the refrigerator 402. The frame is then delivered to a frame crushing apparatus 7 shown in FIG. 11. In the case where the article to be pre-treated is a laundry machine 403, metallic parts such as a motor and a clutch are detached, whereas, when the article is a television receiver 404, a cathode ray tube 306 is detached from the cabinet 305. In fact, most of the parts remaining after the removal of the cathode ray tube 306 is the cabinet 305. The residues are sent to a crushing apparatus 7 shown in FIG. 11.

The metal bulks 304 such as the compressor 302, motor and clutch removed by the pre-treatment apparatus 3 are crushed by the metal bulk crushing apparatus 16. The metal bulk introduced into the metal bulk crushing apparatus 16 is first cooled by a cooling medium 1601 such as liquefied air down to a temperature below embrittlement temperature of ferrous metals, and is crushed by impacts given by the crushing apparatus 18. Consequently, the ferrous metals are crushed into fine fragments which are then conveyed to a metal sorting apparatus 9 shown in FIG. 12, by mean of a conveyor 1602. Meanwhile, the cooling medium which has been gasified by the heat derived from the metal bulk in the cooling device 17 is used as a cooling gas 1603 for cooling a foaming agent collecting apparatus 19 and/or a plastic sorting apparatus 12.

The articles brought into the crushing apparatus 7 are moved into a first crusher 703 at a rate regulated by a hydraulic control system 702, so as to be crushed into fragments of sizes around 100 and are further crushed by a second crusher 704 into finer fragments of sizes around 50 mm.

The waste articles crushed by the crushing apparatus 7 are then delivered to a light-weight article separating apparatus 8 having a windage separator 801 for separating foamed material such as foamed polyurethane. The waste articles after the separation of famed polyurethane therefrom are sent to the metal sorting apparatus 9 shown in FIG. 12, in which the article is subjected to a screening performed by a screen 901 of a mesh size between 80 and 100 mm, whereby stranded copper sheath wires are collected as indicated by an arrow 902. Then, ferrous metal fragments 908 are separated by two stages 903, 904 of magnetic sorter. Furthermore, an aluminum separator 905 having a rotary magnet separates aluminum 906 and other non-ferrous metals by means of eddy electric currents, and further separation of ferrous metals is effected magnetically. The residue obtained after the separation of these metal components is mainly composed of plastics waste fragments 907 which are sent to a plastic sorting apparatus 12 shown in FIG. 13. Meanwhile, the ferrous metals 908 and aluminum 906 separated in the metal sorting apparatus 9 are sent to respective factories for regeneration as indicated by arrows 909 and 910, respectively.

The waste fragments 907 mainly composed of plastic are and received in the plastic sorting apparatus 12 and introduced into reduced into a cold chamber 1203. Liquefied nitrogen from a liquefied nitrogen tank 1201 is evaporated in an evaporator 1202 and the nitrogen gas of very low temperature thus obtained is introduced into the cold chamber 1203 so as to cool the waste fragments 907 down to a very low temperature of −20° C. to −40° C. The gas is again introduced to the evaporator 1202 by means of a blower. The waste cooled in the cold chamber is crushed by a sorting crusher 14. The fragments crushed and separated by the sorting crusher 14 are roughly classified by a sieve type separator 15. Consequently, a hopper 1208 disposed beneath the sieve receives plastics fragments rich in vinyl chloride. The fragments received in the hopper 1208, however, still contains plastics which are other than vinyl chloride and which are reusable. An aqueous separator, i.e., a specific gravity separator denoted by 1209, is employed in this embodiment for the purpose of efficient collection of such reusable plastics and sorting of the thus collected plastics.

Figure 11:
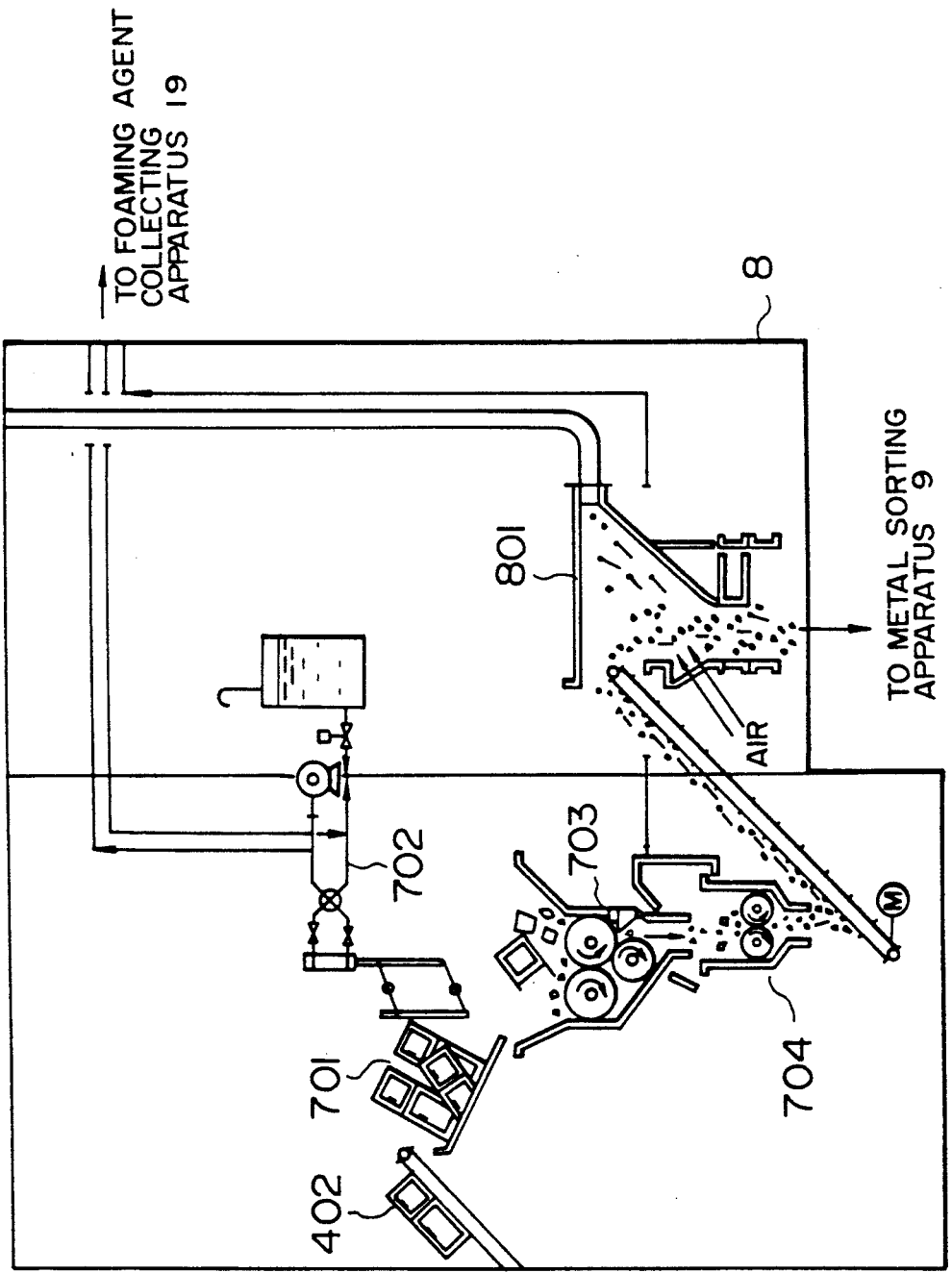
Figure 12:
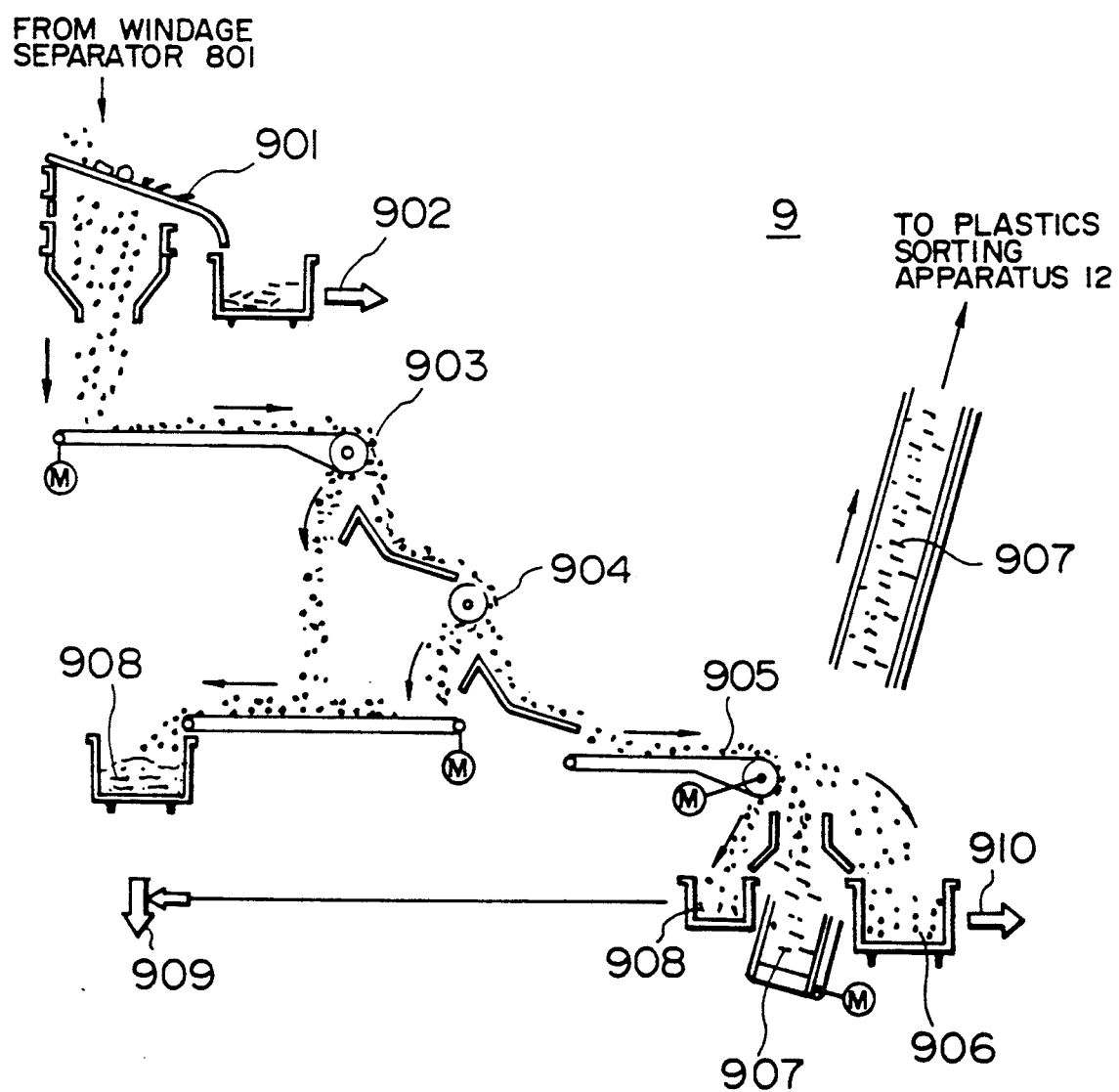
Figure 13:
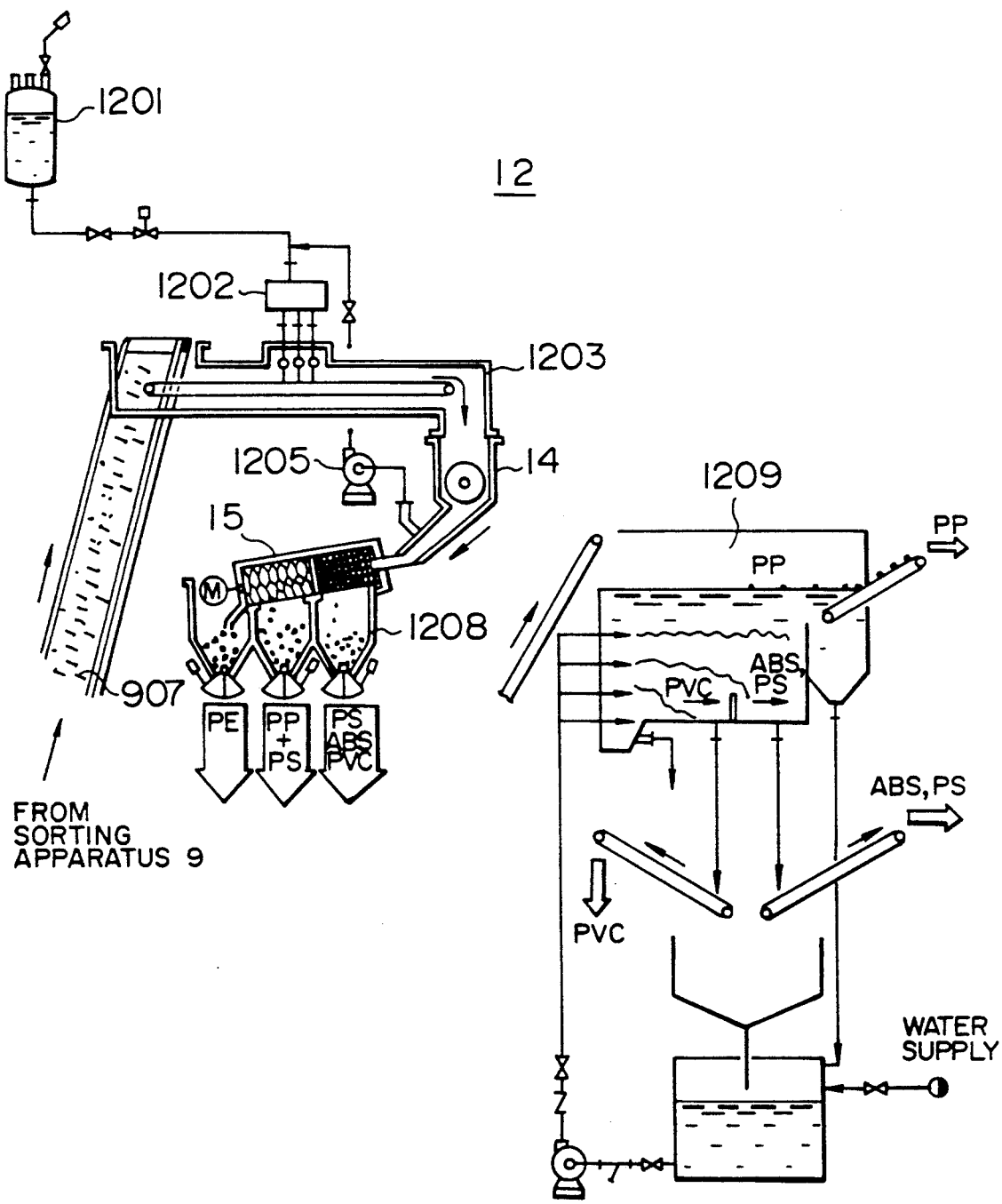
Figure 14:
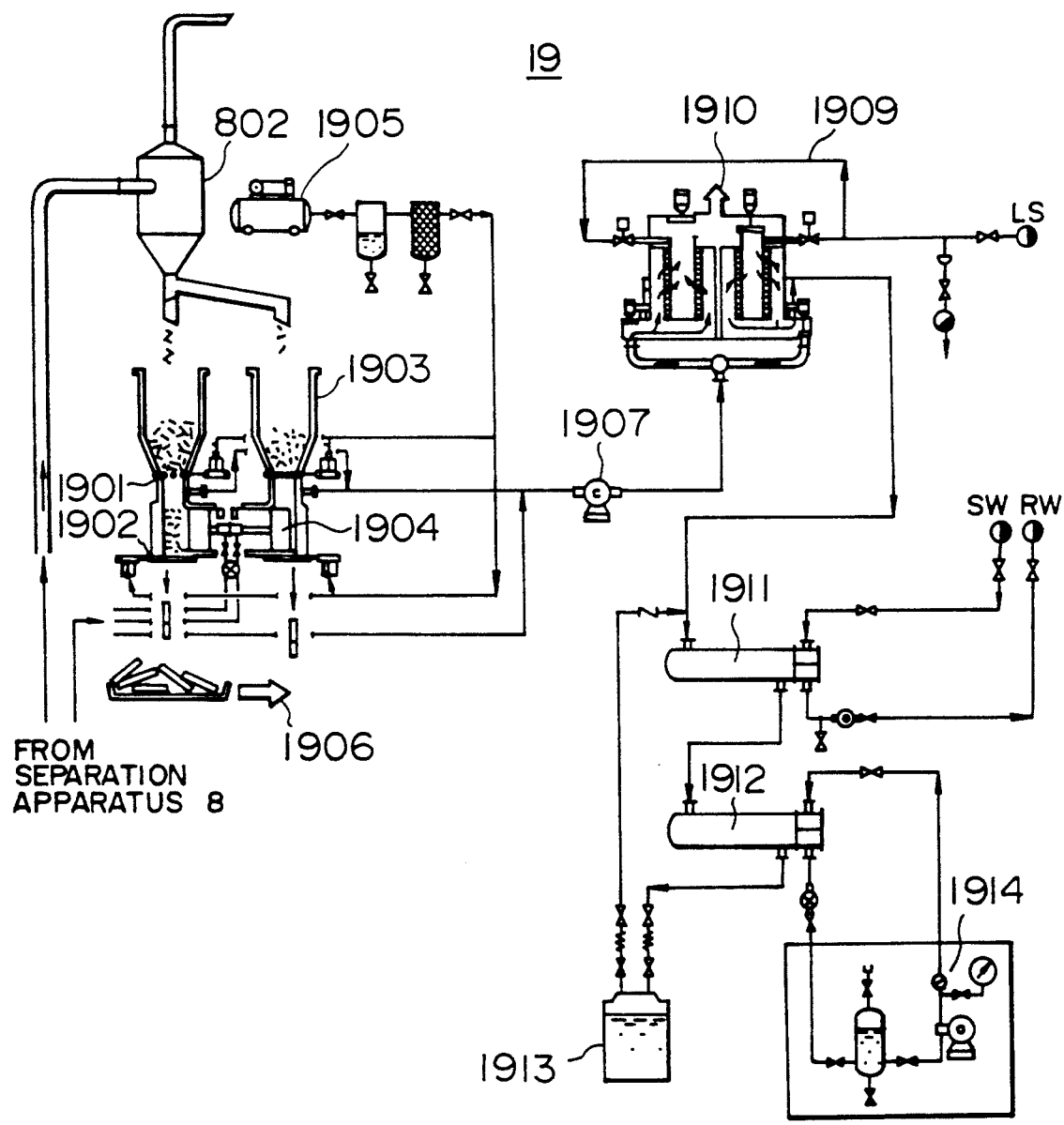
Figure 15:
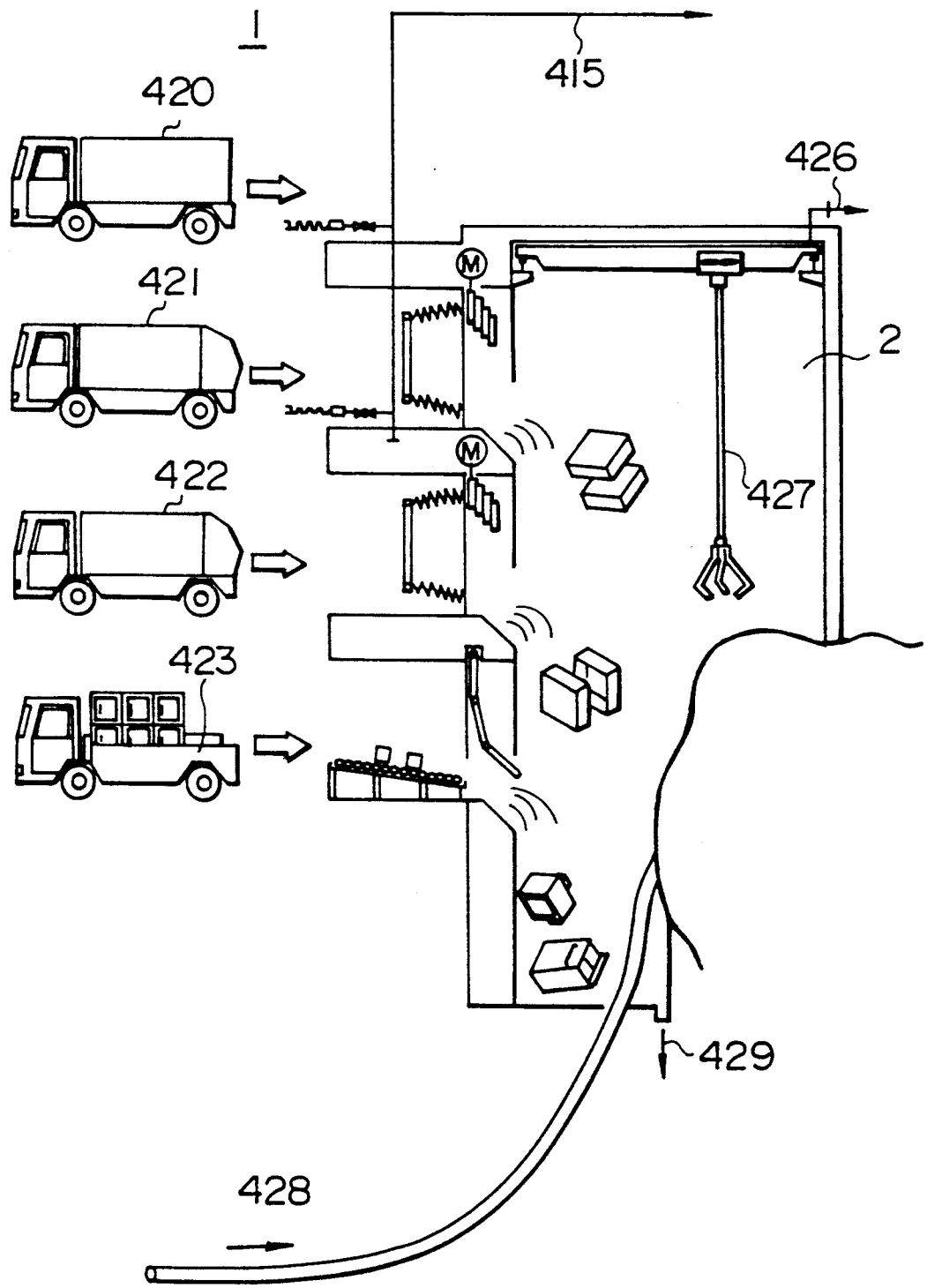

The foamed polyurethane separated by the windage separator 801 shown in FIG. 11 is then delivered to a foaming agent collecting apparatus 19. More specifically, the fragments of foamed articles are introduced into a cyclone separator 802 in which the fragments are separated from the conveyor suspension air and are introduced into a hopper 1903 which has a separation device 1904 having slide gates 1901 and 1902 which can close entrance and exit of the separation device 1904. The plastics and the foaming agent are separated by compression or crushing performed in the separation device 1904. The separated plastics are compacted by the separation device 1904 and is delivered to the exterior of the device 1904 through the slide gate 1902 and is sent as indicated by an arrow 1906 to a site where polyurethane is suitably disposed. Meanwhile, the foaming agent separated by the separation device 1904 is brought by a blower 1907 into contact with activated carbon of an adsorption device 1909 so as to be adsorbed by the activated carbon. The foaming agent is then released by application of heat and is then cooled and liquefied by coolers 1911, 1912 which make use of a cold heat source such as a cooling device 1914, so as to be collected in the form of liquefied foaming agent 1913.

In this embodiment, separate cold heat sources are used for the plastic sorting apparatus 12 and the foaming agent collecting apparatus 19. This arrangement, however, is only illustrative and the arrangement may be such that, when the refrigerating crushing is being conducted in the metal bulk crushing apparatus 16, the wasted cold heat 1603 (see FIG. 9) from the apparatus is commonly used as the cold heat source both for the plastics sorting apparatus 12 and the foaming agent collecting apparatus 19.

FIGS. 15 to 20 show a further embodiment of the present invention which is devoid of the pretreatment apparatus used in the preceding embodiments.

As shown in this Figure, the system has a stockyard 1 and a feeding apparatus 2. The stock yard 1 receives various waste articles collected and delivered by vehicles such as a flon collecting vehicle for local area service 420 (for air conditioners), a packer vehicle (with flon collecting system, including those for refrigerators) 421, a packer vehicle (with flon collection system, excluding refrigerators) 422 and a truck 423. The flon collected by the flon collecting vehicle 420 and the packer vehicle 421 is collected through a line as indicated by an arrow 415 so as to be bottled after separation of oil therefrom. The stock yard has a house-like structure the interior of which is hermetically sealed from the exterior as much as possible. In order to prevent spread of offensive smell, the air in the stockyard 1 is introduced into a deodoration apparatus as indicated by an arrow 426. The bilge (water and oil) generated in the stock yard is introduced into a bilge treating system as indicated by an arrow 429, through a drain provided in the bottom of the stockyard. The waste articles stored in the stockyard 1 is fed by a crane 427 of the feeding apparatus 2 to a crushing apparatus 7 shown in FIG. 16. The crushing apparatus 7 has a springing crusher 707 with an inlet which is adapted to be closed by an anti-explosion shutter 706. An emergency relief port 705 is formed in the top of the crusher 707. The anti-explosion shutter 706 and the emergency relief port 705 prevent accidental pressure rise in the crusher 707 which may be caused when, for example, a gas-containing vessel such as a gas cylinder still containing a gas is introduced as the waste article, thereby ensuring safety. The springing crusher 707 springs out metal bulks such as a motor or a compressor during crushing, while crushing other articles. The fragments obtained through the crushing are sent to a shredder. The articles springed by the crusher 707 are sent by a conveyor 709 to a metal bulk crushing apparatus 16. Meanwhile, rather small household electric machines such as a television receiver, a range or an audio equipment, denoted by 428, is directly sent to the shredder 711, bypassing the springing crusher 707. The shredder 711 shreds the fragments of wasted articles and also sorts the fragments according to the type of the material. Bilge such as oil generated in this shredder 711 is sent for disposal to a bilge treating system as indicated by an arrow 712. The fragments obtained through crushing and separation performed by the shredder 711 are sent to a windage separator 713 of a light-weight article separation apparatus 8 so that foamed urethane fragments are separated from rest portions. The rest portion of the fragments of the waste article is then sent to a metal sorting apparatus shown in FIG. 18. Meanwhile, plastics and the foaming agent in the foamed polyurethane are separated from each other, and the plastics thus separated are picked up and sent to the exterior. The foaming agent, together with the foaming agents separated in the springing crusher 707 and the shredder 711, is collected and sent to a foaming agent collecting apparatus 19 shown in FIG. 20.

Figure 17:
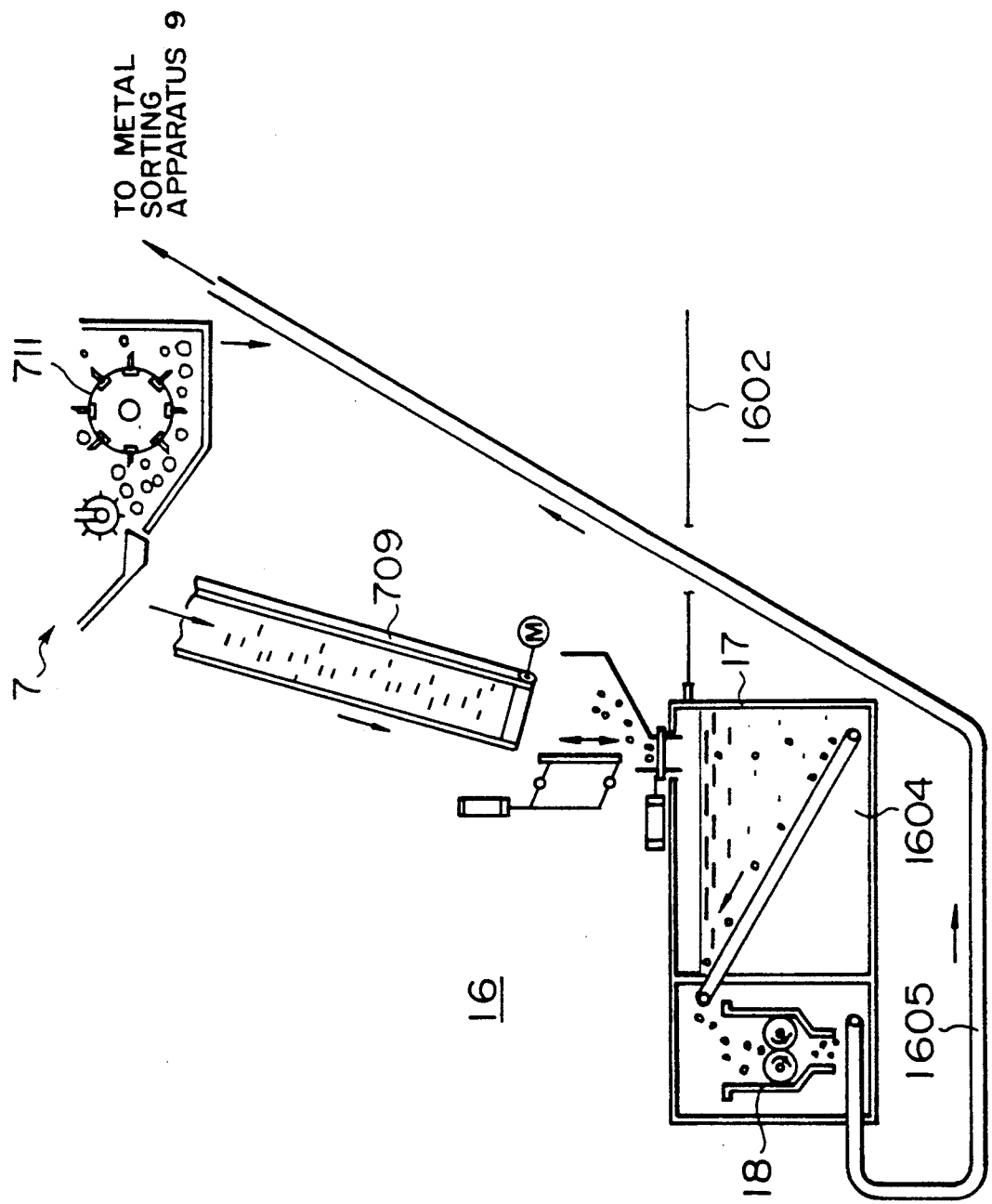
Figure 18:
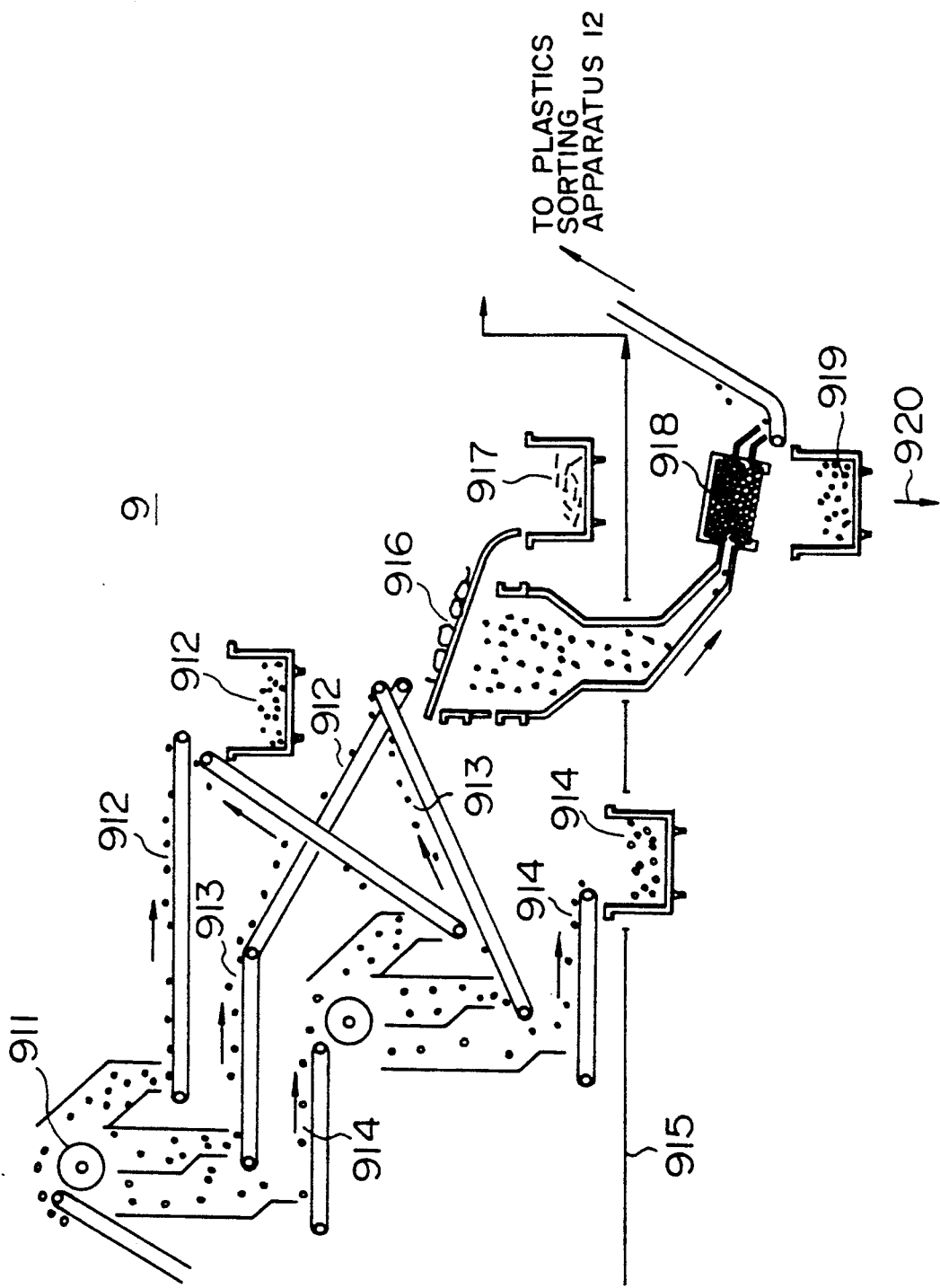
Figure 19:
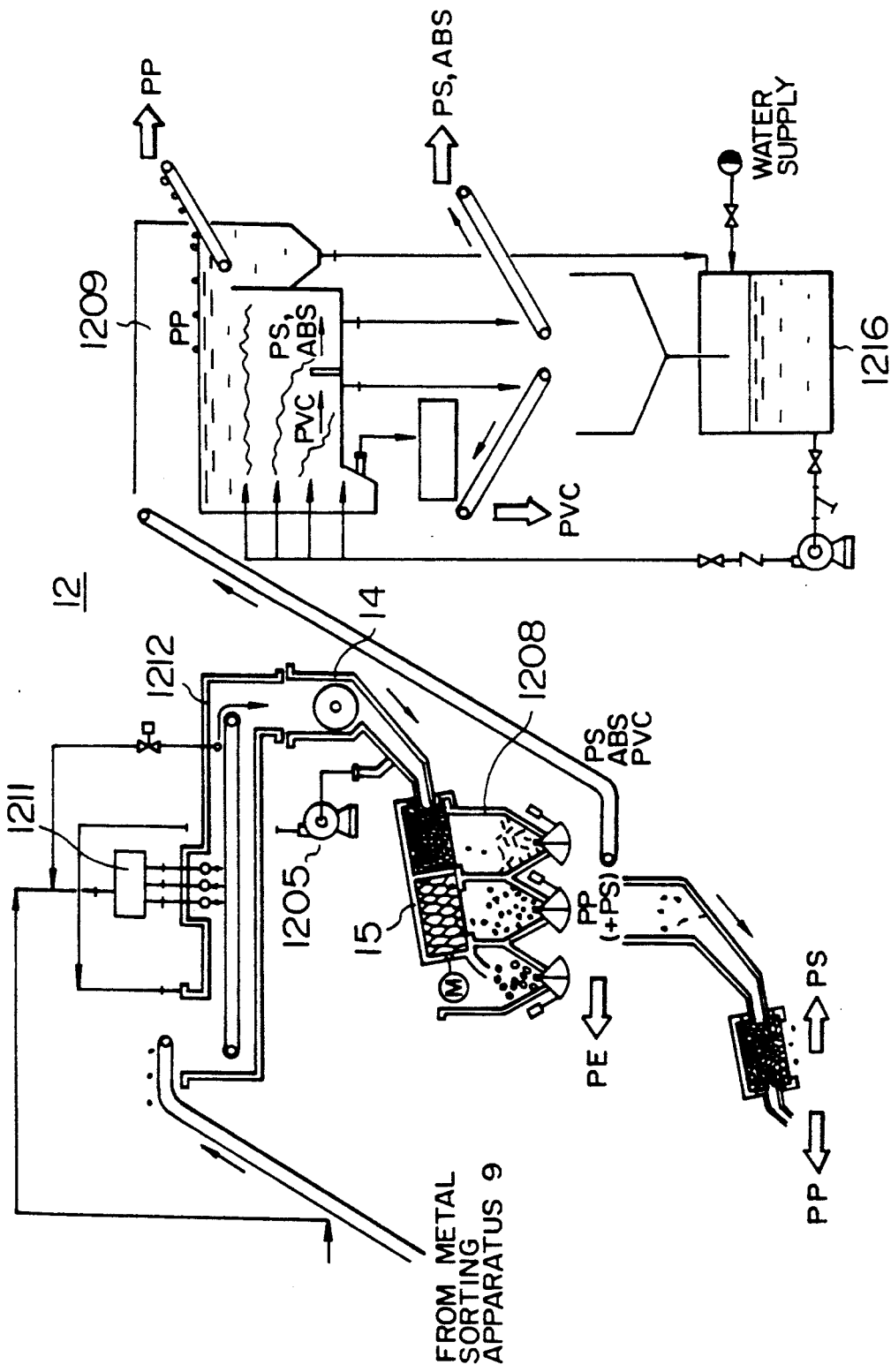
Figure 20:
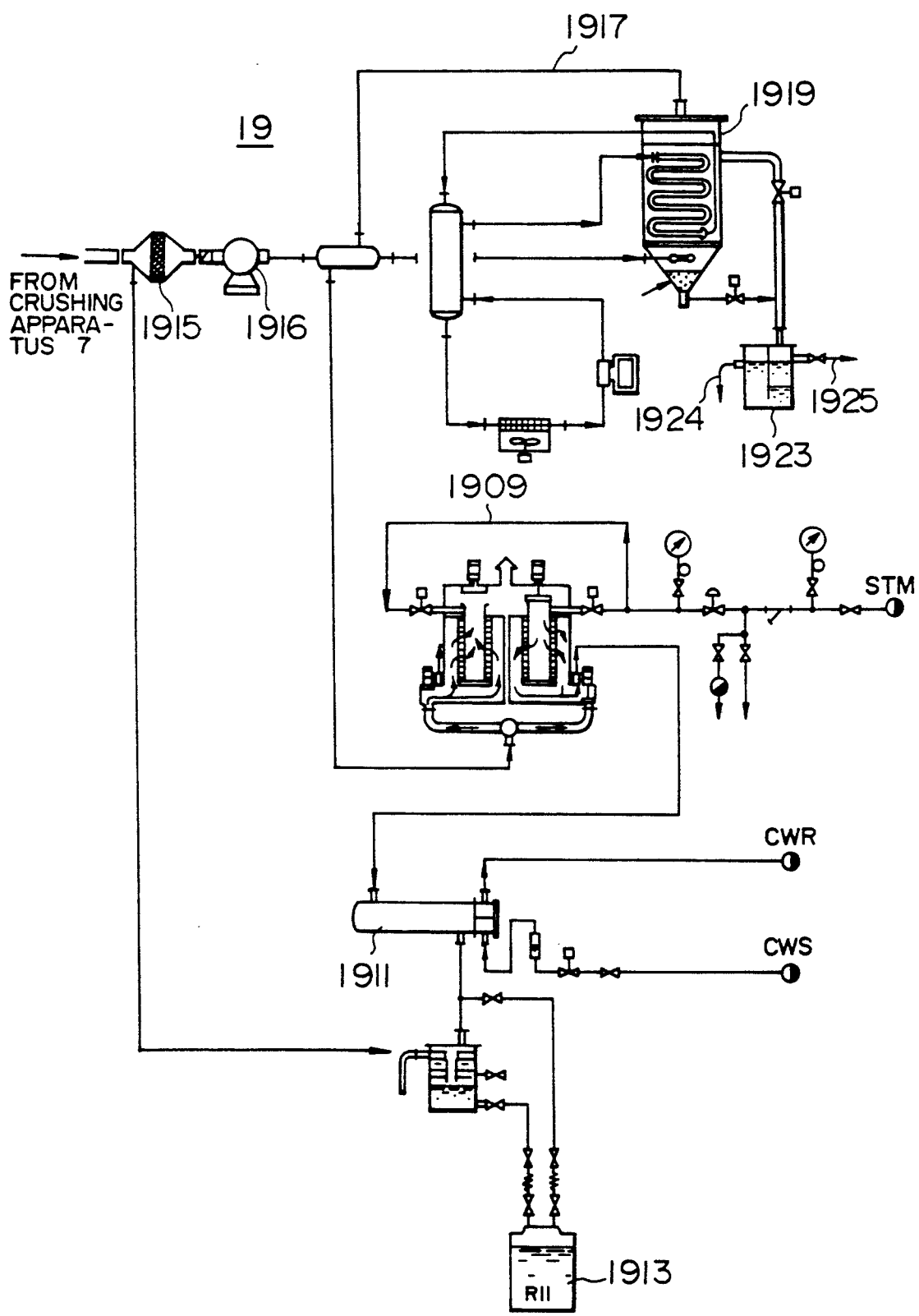

Metal bulk such as a compressor, motor or a clutch, springed out by the springing crusher 707, is sent to a metal bulk crushing apparatus 16 shown in FIG. 17, so as to be crushed by the apparatus 16. The metal bulk crushing apparatus 16 has a cooling device 17 which cools the metal bulk down to a temperature below embrittlement temperature of ferrous metals by using a cooling medium 1604 such as liquefied air. The cooled metal bulk is then crushed by a crusher 18, whereby ferrous metals are crushed into fine fragments. The fine fragments of ferrous metals are sent to a metal sorting apparatus 9 shown in FIG. 19 by means of a conveyor 1605 made of stainless steel or aluminum. The cooling medium which has been gasified as a result of cooling of the metal bulk in the cooling device 17 is used as a cold gas 1602, e.g., as a cooling cold heat source for the foaming agent collecting apparatus 19 and the plastics sorting apparatus 12.

The fragments of waste article introduced into the metal sorting apparatus 9 is sorted into three groups: namely, non-ferrous metals 912, ferrous metals 914 and other matters 913, through two stages of sorting performed by a magnetic sorter 911 which employs a rotary magnet for generating electric eddy currents. The other matters or residue 913 is screened by a screen 916 so that copper wires 917 which may still exist in the residue are collected and glasses 919 and other matters are separated by a sieve 918 having a mesh size between about 5 and 10 mm. The glass and other matters 919 sieved through the sieve are forwarded as indicated by an arrow 920 for a processing such as sintering. The residue left on the sieve is substantially plastics. These plastics are then forwarded to a plastics sorting apparatus 12 shown in FIG. 19.

The waste fragments mainly composed of plastics and received in the plastic sorting apparatus 12 are introduced into a cold chamber 1211. The cold gas 1602 from the metal bulk crushing apparatus 16 shown in FIG. 17 is introduced into the cold chamber 1212 after a temperature regulation by a temperature regulator 1211, so as to cool the waste fragments 907 down to a very low temperature of −20° C. to −40° C. The gas is again introduced to the temperature regulator 1211 by means of a blower 1205. The waste cooled in the cold chamber is crushed by a sorting crusher 14. The fragments crushed and separated by the sorting crusher 14 are roughly classified by a sieve type separator 15. Consequently, a hopper 1208 disposed beneath the sieve receives plastics fragments rich in vinyl chloride. The fragments received in the hopper 1208, however, still contain plastics which are other than vinyl chloride and which are reusable. An aqueous separator, i.e., a specific gravity separator denoted by 1209, is employed for the purpose of efficient collection of such reusable plastics and sorting of the thus collected plastics. The reference specific gravity liquid used in the aqueous separator 1209 is progressively contaminated during the use. Therefore, a specific gravity liquid administration apparatus 1216 is used for controlling the specific gravity of this liquid.

Figure 16:
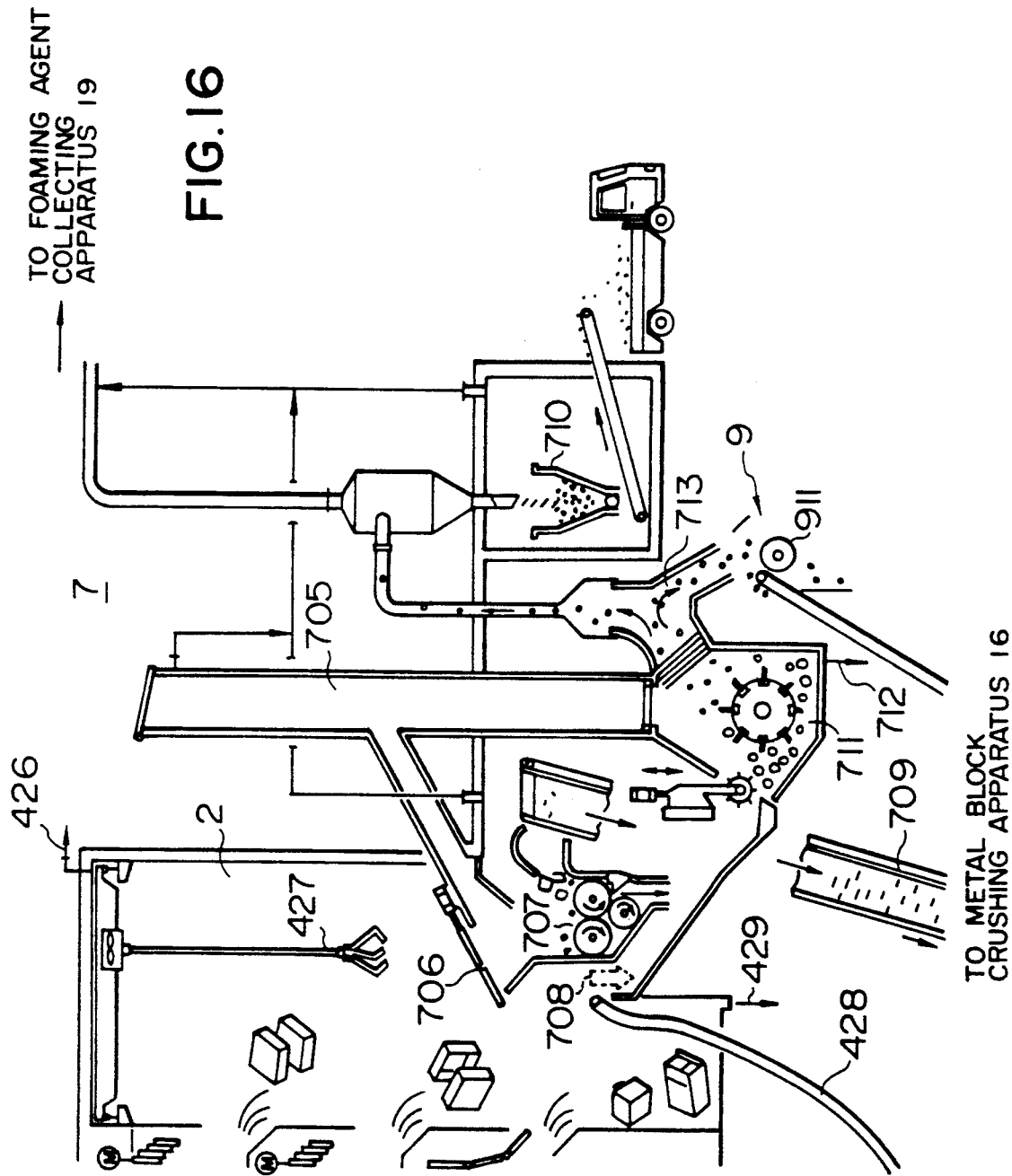

The foaming agent, which has been separated from the foamed polyurethane resin separated by the windage sorter 713 shown in FIG. 16 is sent by a blower 1916 into the foaming agent collecting apparatus 19 through a filter 1915, together with the foaming agents collected in the springing crusher 707 and the shredder 711. The foaming agent collecting apparatus 19 has a cold tank 1919 which liquefies the foaming agent by utilizing latent heat carried away when the agent itself is evaporated. Then, the liquefied foaming agent is made to pass through a water separator 1923 where water is removed from the foaming agent, whereby flon 1925 is collected. The foaming agent rich in air is made to shut at a point upstream of the cold tank 1919 and is adsorbed by activated carbon of an adsorption device 1909 as in the preceding embodiment. The foaming agent adsorbed on the activated carbon is released by application of heat and is liquefied through a cooler 1911 so as to be collected as liquefied foaming agent 1913.

In this embodiment, the plastic sorting apparatus 12 and the foaming agent collecting apparatus 19 employ independent cold heat sources. The arrangement, however, may be such that the cold heat 1602 wasted in the metal bulk crushing apparatus 16 is commonly used as the cold heat source both by the plastics sorting apparatus 12 and the foaming agent collecting apparatus 19.

Preferred embodiments of the waste disposal system of the present invention, capable of conducting overall treatments, have been described. It is to be understood, however, that various components of the described embodiments can be freely combined or replaced with each other and that the invention does not exclude the use of only a part of each system. For instance, it is possible to obtain a disposal system capable of performing a through process for sorting and disposing plastics, which hitherto has not been conducted, by combining the plastic sorting apparatus 12 with other components such as the feeding apparatus 2, crushing apparatus 7 and the metal sorting apparatus 9. A system also can be composed of the feeding apparatus 2, crushing apparatus 7 and the metal sorting apparatus 9. It is also possible to form an overall industrial waste disposal system by adding the plastic sorting apparatus 12 to the system composed of the feeding apparatus 2, crushing apparatus 7 and the metal sorting apparatus 9, with the upstream or downstream end of the feeding apparatus 2 being connected to the pre-treatment apparatus 3 which has at least one of the large-size glass separating means 5, refrigerant collecting means 4 and the metal bulk separating means 6. Provision of a low-temperature crushing apparatus for crushing metal bulks, in parallel with each of the systems described, is effective in reducing power required for crushing metal bulks and in prolonging the life of the crushing apparatus.

It is also possible to form a system having the feeding apparatus 2, crushing apparatus 7 and the metal sorting apparatus 9, with or without addition of the plastics sorting apparatus, wherein the light-weight article sorting apparatus 8 is connected to the downstream end of the crushing apparatus 7, with the foaming agent collecting apparatus connecting in a line shunting from the light-weight article separating apparatus so that collection of foaming agent is performed in parallel with the main route.

As will be understood from the foregoing description, the present invention provides a waste disposal system which can efficiently treat almost all types of large-size waste articles and which can collect and recover materials of these articles, thus making it possible to reuse these materials, while contributing to preservation of natural resources. Furthermore, the present invention greatly reduces the volume of the fragments which are to be finally disposed of for reclaiming purpose, which well cope with the current problem in regard to restriction in the reclamation area.

It is also to be noted that the system of the present invention does not substantially require burning step, which is advantageous from the view point of prevention of warming of the earth by carbon dioxide generated as a result of burning.

Furthermore, the system of the present invention, unlike known waste disposal system, is capable of collecting flons which have been broadly used as refrigerants or as foaming agents, thus contributing greatly to preservation of global environment.

What is claimed is:

1. A waste disposal system comprising:
   a stock yard for storing waste articles comprising a metal bulk and other components;
   pre-treatment apparatus including metal bulk separating means for separating said metal bulk from said other components of said waste articles;
   a cryogenic crushing apparatus for crushing said metal bulk thus separated by said metal bulk separating means;
   a crushing apparatus for crushing said other components of said waste articles into fragments;
   a light-weight article separating apparatus for separating said fragments obtained through the crushing performed by said crushing apparatus into fragments of foamed material and other waste; and
   a foaming agent collecting apparatus including a crusher for crushing said fragments of said foamed material separated by light-weight article separating apparatus, a separator for separating the crushed fragments of said foamed material thus crushed by said separator into plastics and a gaseous foaming agent, and a foaming agent cooling device for liquefying said gaseous foaming agent by cooling.

2. A waste disposal system according to claim 1, wherein said pre-treatment apparatus includes refrigerant collecting means for collecting refrigerant from said waste article.

3. A waste disposal system according to claim 1, wherein said pre-treatment apparatus includes large-size glass separating means for detaching large-size glass from said waste article.

4. A waste disposal system according to claim 1, wherein said pre-treatment apparatus further includes means for separating large-size glass from said waste articles.

5. A waste disposal system according to claim 4, further comprising feeding apparatus for feeding, while sorting, said waste articles from said stockyard selectively to said refrigerant collecting means and said large-size glass separating means of said pre-treatment apparatus.

6. A waste disposal system according to claim 1, further comprising a metal sorting apparatus which separates said other waste obtained through said light-weight article separating apparatus into ferrous metals and non-ferrous metals.

7. A waste disposal system according to claim 6, wherein said metal sorting apparatus includes a magnetic sorter and an eddy-current sorter.

8. A waste disposal system according to claim 7, wherein said metal sorting apparatus further includes a stainless steel separator which is disposed between said magnetic sorter and said eddy-current sorter and which produces magnetism of a greater intensity than that produced by said eddy-current sorter.

9. A waste disposal system according to claim 7, wherein said metal sorting apparatus further includes a specific gravity sorter which is provided downstream of said eddy-current sorter and which is used for sorting non-ferrous metals.

10. A waste disposal system according to claim 8, wherein said metal sorting apparatus further includes a specific gravity sorter which is provided downstream of said eddy-current sorter and which is used for sorting non-ferrous metals.

11. A waste disposal system according to claim 6, further comprising a plastics sorting apparatus disposed downstream of said metal sorting apparatus.

12. A waste disposal system according to claim 7, further comprising a plastics sorting apparatus disposed downstream of said eddy-current sorter.

13. A waste disposal system according to claim 11, further comprising an electrostatic separating apparatus disposed between said metal sorting apparatus and said plastics sorting apparatus.

14. A waste disposal system according to claim 9, further comprising an electrostatic separation apparatus disposed downstream of said eddy-current sorter in parallel with said specific gravity sorter.

15. A waste disposal system according to claim 11, wherein said plastic sorting apparatus includes, for crushing plastics by making use of cold embrittlement of said plastics, a cooling device for cooling said plastics and a crusher for crushing the cooled plastics.

16. A waste disposal system according to claim 15, wherein said plastics sorting apparatus further includes a sieve-type sorter disposed downstream of said crusher.

17. A waste disposal system according to claim 16, wherein said plastics sorting apparatus further includes a specific gravity sorter disposed downstream of said sieve-type sorter.

18. A waste disposal system according to claim 11, wherein said plastics sorting apparatus includes, for crushing said plastics by making use of drying embrittlement of aid plastics, a dryer and a crusher.

19. A waste disposal system according to claim 18, wherein said plastics sorting apparatus further includes an electrostatic separator disposed downstream of said crusher and a specific gravity sorter disposed downstream of said electrostatic sorter.

20. A waste disposal system according to claim 18, wherein said plastics sorting apparatus further includes a two-staged electrostatic separator disposed downstream of said crusher.

21. A waste disposal system according to claim 6, wherein the metals crushed by said cryogenic crushing apparatus are delivered to said metal sorting apparatus.

22. A waste disposal system according to claim 1, wherein said cryogenic crushing apparatus includes a cooling device and an impacting crusher.

23. A waste disposal system according to claim 2, wherein said refrigerant collecting means includes an oil separator for separating oil from the refrigerant, a compressor for producing the power for collecting the refrigerant, and a cooling device for cooling and liquefying the collected refrigerant.

* * * * *